United States Patent
Jain et al.

(10) Patent No.: US 10,484,528 B2
(45) Date of Patent: Nov. 19, 2019

(54) APPARATUS AND METHOD FOR MANAGING OPERATIONS FOR PROVIDING SERVICES AUTOMATICALLY

(71) Applicant: Samsung Electronics Co., Ltd., Suwon-si, Gyeonggi-do (KR)

(72) Inventors: Ankit Jain, Bangalore (IN); Nabeel Mohamed C. L., Bangalore (IN); Harit Sharma, Bangalore (IN); Abhilash Srivastava, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/883,761

(22) Filed: Jan. 30, 2018

(65) Prior Publication Data
US 2018/0219988 A1    Aug. 2, 2018

(30) Foreign Application Priority Data
Jan. 30, 2017   (IN) .............................. 201741003400

(51) Int. Cl.
*H04B 7/00* (2006.01)
*H04M 1/725* (2006.01)
(Continued)

(52) U.S. Cl.
CPC .......... *H04M 1/7253* (2013.01); *G06F 1/163* (2013.01); *G06F 1/1626* (2013.01);
(Continued)

(58) Field of Classification Search
CPC .... H04W 4/80; H04W 12/00508; H04W 4/21
See application file for complete search history.

(56) References Cited

U.S. PATENT DOCUMENTS

| | | | |
|---|---|---|---|
| 2015/0223032 A1* | 8/2015 | Nespolo ................. | H04W 4/12 701/2 |
| 2015/0261306 A1 | 9/2015 | Lake | |

(Continued)

FOREIGN PATENT DOCUMENTS

| | | |
|---|---|---|
| EP | 2 899 628 A1 | 7/2015 |
| KR | 10-2016-0066269 A | 6/2016 |
| KR | 10-2016-0131151 A | 11/2016 |

OTHER PUBLICATIONS

International Search Report dated May 28, 2018, issued in International Patent Application No. PCT/KR2018/001285.

(Continued)

*Primary Examiner* — Tuan Pham
(74) *Attorney, Agent, or Firm* — Jefferson IP Law, LLP

(57) ABSTRACT

A method and system for rendering user intent across electronic devices are provided. The method includes extracting by a first electronic device, a user intent associated with a context of a second electronic device, on detecting a gesture performed in proximity with the second electronic device. The gesture detected by the first electronic device in proximity with the second electronic device can establish a communication with the second electronic device. The method includes rendering the user intent associated with the context of the second electronic device to continue the user intent on the first electronic device. The method includes invoking one or more actions associated with the user intent to extend usability of the user intent rendered from the second electronic device to the first electronic device. Thus, the various embodiments herein avoid manual intervention and thereby reduce the turnaround time for accessing applications across the electronic devices.

20 Claims, 37 Drawing Sheets

(51) Int. Cl.
| | |
|---|---|
| *H04W 76/14* | (2018.01) |
| *G06F 3/01* | (2006.01) |
| *G06F 1/16* | (2006.01) |
| *H04W 4/80* | (2018.01) |
| *H04W 4/21* | (2018.01) |
| *H04W 12/00* | (2009.01) |
| *G06F 3/0488* | (2013.01) |

(52) U.S. Cl.
CPC .......... *G06F 1/1694* (2013.01); *G06F 1/1698* (2013.01); *G06F 3/017* (2013.01); *H04W 4/21* (2018.02); *H04W 4/80* (2018.02); *H04W 12/00508* (2019.01); *H04W 76/14* (2018.02); *G06F 3/04886* (2013.01); *H04M 1/72552* (2013.01)

(56) References Cited

U.S. PATENT DOCUMENTS

| | | | |
|---|---|---|---|
| 2015/0334519 A1 | 11/2015 | Gai et al. | |
| 2016/0065717 A1 | 3/2016 | Ilmonen et al. | |
| 2016/0150350 A1 | 5/2016 | Ingale et al. | |
| 2016/0283020 A1 | 9/2016 | Heo et al. | |
| 2016/0299570 A1* | 10/2016 | Davydov | ................ G06F 1/163 |
| 2017/0038847 A1* | 2/2017 | Schorsch | ................ G06F 3/017 |
| 2018/0181265 A1* | 6/2018 | Kim | ........................ H04L 51/04 |

OTHER PUBLICATIONS

European Search Report dated Oct. 7, 2019, issued in European Patent Application No. 18744112.6.

\* cited by examiner

APPARATUS AND METHOD FOR MANAGING OPERATIONS FOR PROVIDING SERVICES AUTOMATICALLY

CROSS-REFERENCE TO RELATED APPLICATION(S)

This application claims the benefit under 35 U.S.C. § 119(a) of an Indian provisional application filed on Jan. 30, 2017 in the Indian Intellectual Property Office and assigned Serial number 201741003400 and of an Indian complete application filed on Jul. 18, 2017 in the Indian Intellectual Property Office and assigned Serial number 201741003400, the entire disclosure of each of which is hereby incorporated by reference.

TECHNICAL FIELD

The present disclosure relates to the field of electronic devices. More particularly, the present disclosure relates to rendering user intent across electronic devices.

BACKGROUND

In general, users can access services and data using multiple devices. Sometimes, the users will be accessing the devices simultaneously and would like to switch seamlessly across the devices. The existing solutions involve multiple manual operations and unnecessary cognitive load to support seamless interaction across the devices. The more manual procedures to perform operations like executing functions or providing services in the devices, the more uncomfortable the user will feel. This mostly becomes a cumbersome process with increased turnaround time and thus significantly degrades the user experience.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide methods and systems for rendering a user intent across electronic devices, wherein a method includes extracting a user intent associated with a context of a second electronic device and rendering the user intent associated with the context of the second electronic device to continue the user intent on the first electronic device. By executing functions intuitively and providing services automatically, the user intent can be rendered.

In accordance with an aspect of the present disclosure, a method and system for rendering user intent across electronic devices are provided. The method includes extracting a user intent associated with a context of a second electronic device, on detecting by the first electronic device, a gesture performed in proximity with the second electronic device. The gesture detected by the first electronic device in proximity with the second electronic device can establish a communication with the second electronic device. Further, the method includes rendering the user intent associated with the context of the second electronic device to continue the user intent on the first electronic device. Further, the method includes invoking one or more actions associated with the user intent to extend usability of the user intent rendered from the second electronic device to the first electronic device.

In accordance with another aspect of the present disclosure, an electronic device for rendering user intent is provided. The electronic device includes a gesture detection unit and a user intent rendering unit. The gestured detection unit and the user intent rendering unit is configured to extract a user intent associated with a context of a second electronic device, on detecting by the electronic device, a gesture performed in proximity with the second electronic device. The gesture detected by the electronic device in proximity with the second electronic device can establish a communication with the second electronic device. Further, the user intent rendering unit is configured to render the user intent associated with the context of the second electronic device to continue the user intent on the electronic device. Further, the user intent rendering unit is configured to invoke one or more actions associated with the user intent to extend usability of the user intent rendered from the second electronic device to the electronic device.

In accordance with another aspect of the present disclosure, a method for operating a first electronic device, the method comprises identifying an operation based on a gesture performed with a second electronic device and information associated with a content provided by a second electronic device, and performing the identified operation to provide actions associated with the content on the first electronic device.

In accordance with another aspect of the present disclosure, an apparatus of a first electronic device, the apparatus comprises a memory storing instructions, and at least one processor, which when executing the instructions, is configured to identifying an operation based on a gesture performed with a second electronic device and information associated with a content provided by a second electronic device, and performing the identified operation to provide actions associated with the content on the electronic device.

In accordance with another aspect of the present disclosure, a non-transitory computer readable medium comprising instructions, which when executed by at least one processor of a first electronic device, causes the at least one processor to identify an operation based on a gesture performed with a second electronic device and information associated with a content provided by a second electronic device and perform the identified operation to provide actions associated with the content on the first electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
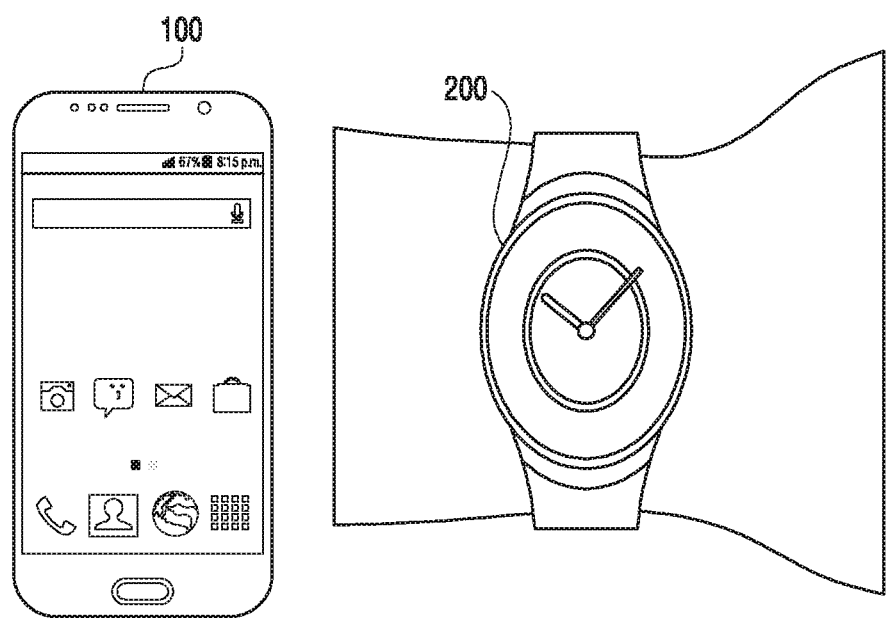
FIGS. 1A, 1B, 1C, and 1D are example illustrations of rendering a user intent associated with a second electronic device (e.g., a smart watch) to a first electronic device (e.g., a smartphone), according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to various embodiments of the present disclosure may be a device including a communication function. For example, the electronic device may include at least one of a Smartphone, a Tablet Personal Computer (PC), a Mobile Phone, a Video Phone, an Electronic Book (e-book) reader, a Desktop PC, a Laptop PC, a Netbook Computer, a Personal Digital Assistant (PDA), a Portable Multimedia Player (PMP), an MP3 player, a Mobile Medical Appliance, a Camera, and a Wearable Device (e.g. a Head-Mounted-Device (HMD) such as electronic glasses, electronic clothes, an electronic bracelet, an electronic necklace, an electronic appcessory, electronic tattoos, or a smartwatch).

According to some embodiments, the electronic device may be a smart home appliance with a communication function. For example, the smart home appliance may include at least one of a television, a digital video disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame.

According to some embodiments, the electronic device may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) of a shop.

The various embodiments herein provide methods for rendering user intent across electronic devices. The methods include extracting a user intent associated with a context of a second electronic device, on detecting by the first electronic device, a gesture performed in proximity with the second electronic device. The gesture detected by the first electronic device in proximity with the second electronic device can establish a communication with the second electronic device. Further, the method includes rendering the user intent associated with the context of the second electronic device to continue the user intent on the first electronic device. Further, the method includes invoking one or more actions associated with the user intent to extend usability of the user intent rendered from the second electronic device. The various embodiments herein establish the communication between the first electronic device and the second electronic device based on proximity, which will circumvent the unavoidable mental assimilation of context, avoid manual intervention and thereby reduce the turn-around time for accessing applications across the devices (for example, first electronic device and second electronic device).

The various embodiments herein achieve a method and system for performing operations to render user intent across electronic devices. The performed operations comprise executing functions, providing services, displaying some objects, and so on. Referring now to the drawings, and more particularly to FIGS. 1A to 1D, 2A and 2B, 3, 4A to 4E, 5A to 5C, 6A to 6C, 7A to 7C, 8A to 8C, 9A to 9C, 10A to 10C, and 11 to 17, where similar reference characters denote corresponding features consistently throughout the figures, there are shown example embodiments.

FIGS. 1A to 1D are example illustrations of rendering a user intent associated with a second electronic device (e.g. smart watch) 200 to a first electronic device (e.g., a smartphone) 100, according to various embodiments of the present disclosure.

Figure 1B:
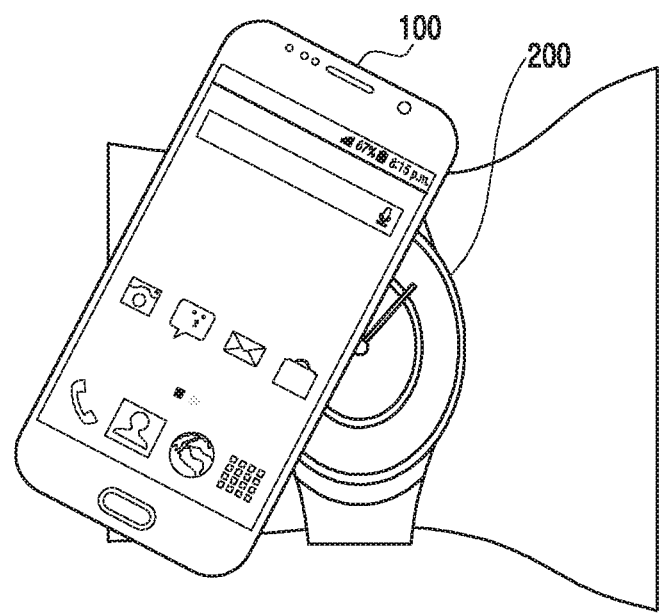
Figure 1C:
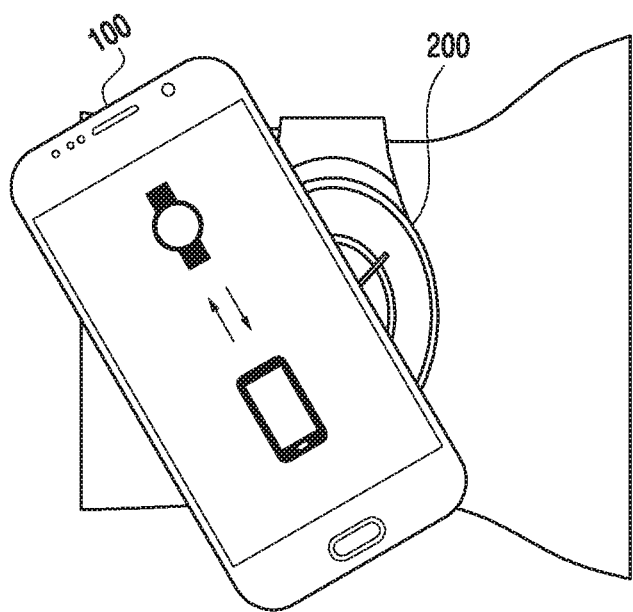
Figure 1D:
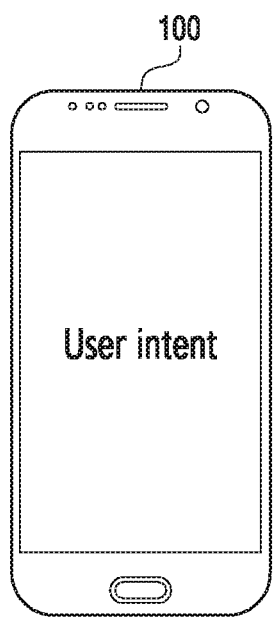

FIGS. 1A to 1D depicts the first electronic device 100 and the second electronic device 200, wherein the first electronic device 100 and the second electronic device 200 are in proximity with each other. Initially, the first electronic device 100 and the second electronic device 200 are in their own state. To render a user intent associated with the context of the second electronic device 200 to the first electronic device 100, the first electronic device 100 can be configured to perform a gesture (for example, the gesture can be hovering over the first electronic device on the smart watch) towards the nearby second electronic device 200 as shown in FIG. 1B to establish a communication with the second electronic device 200. The connection can be established using any of the following communication mechanisms such as Bluetooth, Wi-Fi, infrared data association (IrDA), 3G/LTE (Long term evolution), ultra wideband (UWB), near field communication (NFC) or Bluetooth low energy (BLE) communication or the like. Further, the first electronic device 100 can be configured to extract a user intent associated with a context of the second electronic device 200 as shown in FIG. 1C. The context can be for example, a received message notification, an incoming call, a current application running on the second electronic device 200 or any other activity associated with the second electronic device 200. Further, the first electronic device 100 can be configured to render the user intent associated with the context of the second electronic device to continue the user intent on the first electronic device 100 as shown in FIG. 1D. Further, the first electronic device 100 can be configured to invoke one or more actions associated with the user intent to extend usability of the user intent. The actions comprise at least one of an execution of functions configured in the first electronic device 100, providing services in conjunction with the web, or displaying objects associated with the user intent. The actions can be for example, booking a cab, receiving on incoming call, replying to a received message, adding an event reminder to a calendar or the like. In an embodiment, the user intent can be rendered based on metadata associated with the context of the second electronic device 200. The metadata can be for example, the electronic device 200 type (in-vehicle display, smart phone, smart watch, laptop, tablet, or the like.), state (docked, charging, idle or the like.) and locally stored information (calendar entries, notes, mails and conversations, or the like.), application content category (messaging, shopping, stocks, social media, or the like.), user specific data/preferences, detected gesture information (hover, shake, rotate, user defined, or the like.), system environment factors (time of the day, weather, location, network status, or the like.) and or the like. The user can extend usability of the rendered user intent on to the first electronic device 100. For example, if the user has received a message notification on the second electronic device 200, the first electronic device 100 can be configured to render a message reply interface (i.e., the user intent) associated with the context of the message notification to the first electronic device 100. Further, the user can replay to the message notification which is received on the second electronic device 200 through the first electronic device 100.

Figure 2A:
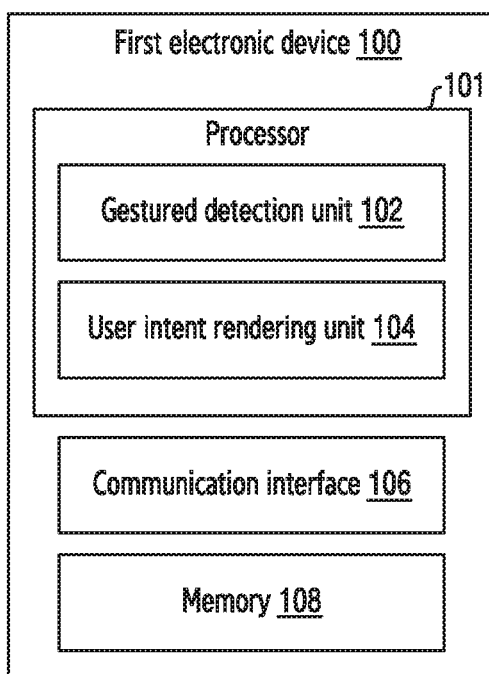
FIG. 2A is a block diagram illustrating various components of a first electronic device, according to various embodiments of the present disclosure.

FIG. 2A is a block diagram illustrating various components of a first electronic device 100, according to various embodiments of the present disclosure.

Referring to FIG. 2A, the first electronic device 200 can be at least one of but not restricted to a mobile phone, a smartphone, tablet, a phablet, a personal digital assistant (PDA), a laptop, a computer, a wearable computing device, an Internet of things (IoT) device, a smart television (TV), wearable device (for example, smart watch, smart band), a vehicle infotainment system, virtual reality (VR) devices, headphones, earphones, biomedical devices or any other electronic device which can establish a wireless communication with at least one other electronic device. The first electronic device 100 includes at least one processor 101, a communication interface 106 and a memory 108. The at least one processor 101 may include a gesture detection unit 102 and a user intent rendering unit 104. The at least one processor 101 may execute instructions corresponding to the gesture detection unit 102 and the user intent rendering unit 104. However, at least one of the gesture detection unit 102 or the user intent rendering unit 104 may be a component separate from the at least one processor 101.

The gesture detection unit 102 can be configured to detect a gesture performed in proximity with the second electronic device 200 to establish a communication with the second electronic device 200. The user intent rendering unit 104 can be configured to identify and render a user intent associated with a context of the second electronic device 200. The context can be for example, a message notification, an incoming call, a current application running on the second electronic device 200 or any other activity associated with the second electronic device 200. Further, the user intent rendering unit 104 can be configured to render the user intent associated with the context of the second electronic device 200 to continue the user intent on the first electronic device 100. Further, the first electronic device 100 can be configured to invoke one or more actions associated with the user intent to extend usability of the user intent. The actions can be for example, booking a cab, receiving on incoming call, replying to a received message, adding an event reminder to a calendar or the like.

The communication interface 106 can be configured to establish communication between the first electronics device 100 and the second electronic device 200 through a wireless network interface. The communication interface 106 comprises at least one transceiver to communicate with another electronic device (i.e. the second electronic device 200).

The memory 108 can be configured to store all types of data that is required to render the user intent associated with the context of the second electronic device 200 to continue the user intent on the first electronic device 100. The memory 108 may include one or more computer-readable storage media. The memory 108 may include non-volatile storage elements. Examples of such non-volatile storage elements may include magnetic hard discs, optical discs, floppy discs, flash memories, or forms of electrically programmable read only memory (EPROM) or electrically erasable and programmable ROM (EEPROM). In addition, the memory 108 may, in some examples, be considered a non-transitory storage medium. The term "non-transitory" may indicate that the storage medium is not embodied in a carrier wave or a propagated signal. However, the term "non-transitory" should not be interpreted to mean that the memory 108 is non-movable. In some examples, the memory 108 can be configured to store larger amounts of information than the memory. In certain examples, a non-transitory storage medium may store data that can, over time, change (e.g., in random access memory (RAM) or cache).

The term 'first' and 'second referred herein are used for the purpose of labeling. However, the first the second can be used interchangeably.

FIG. 2A shows units of the first electronic device 100, but it is to be understood that other embodiments are not limited thereon. In other embodiments, the first electronic device 100 may include less or more number of units. Further, the labels or names of the units are used only for illustrative purpose and does not limit the scope of the disclosure. One or more units can be combined together to perform same or substantially similar function in the first electronic device 100.

According to various embodiments, an electronic device (100) for rendering user intent, the electronic device (100) comprising a gesture detection unit (102), and a user intent rendering unit (104) configured to extract a user intent associated with a context of a second electronic device (200), and render the user intent associated with the context of the second electronic device (200) to continue the user intent on the first electronic device (100).

In one example, the electronic device (100) further configured to invoke at least one action associated with the user intent to extend usability of the user intent.

In another example, the electronic device (100) is configured to extract the user intent by detecting a gesture performed in proximity with the second electronic device (200) and extracting the user intent associated with the context of a second electronic device (200) based on the detected gesture.

In yet another example, the user intent is extracted based on a metadata associated with the context of the second electronic device (200).

Figure 2B:
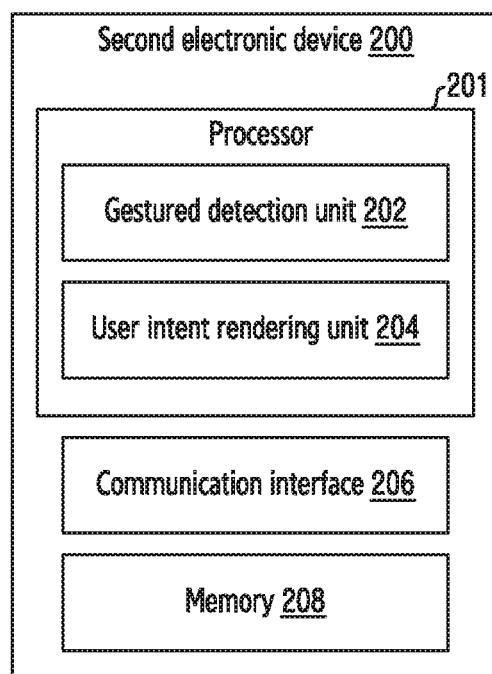
FIG. 2B is a block diagram illustrating various components of a second electronic device, according to various embodiments of the present disclosure.

FIG. 2B is a block diagram illustrating various components of the second electronic device 200, according to various embodiments of the present disclosure.

In an embodiment, the second electronic device 200 can be at least one of but not restricted to a mobile phone, a smartphone, tablet, a phablet, a PDA, a laptop, a computer, a wearable computing device, an IoT device, a smart TV, wearable device (for example, smart watch, smart band), a vehicle infotainment system, VR devices, headphones, earphones, biomedical devices or any other electronic device which can establish a wireless communication with at least one other electronic device. The second electronic device 200 includes at least one processor 201, a gesture detection unit 202, a user intent rendering unit 204, a communication interface 206 and a memory 208. The at least one processor may include a gesture detection unit 202 and a user intent rendering unit 204. The at least one processor 201 may execute instructions corresponding to the gesture detection unit 202 and the user intent rendering unit 204. However, at least one of the gesture detection unit 202 or the user intent rendering unit 204 may be a component separate from the at least one processor 201.

The functionalities of the various units (202-208) of the second electronic device 200 are same as that of the first electronic device 100. For the sake of brevity, the descriptions of the units of the second electronic device 200 are not repeated here.

FIG. 2B shows units of the second electronic device 200, but it is to be understood that other embodiments are not limited thereon. In other embodiments, the second electronic device 200 may include less or more number of units. Further, the labels or names of the units are used only for illustrative purpose and does not limit the scope of the disclosure. One or more units can be combined together to perform same or substantially similar function in the second electronic device 200.

Figure 3:
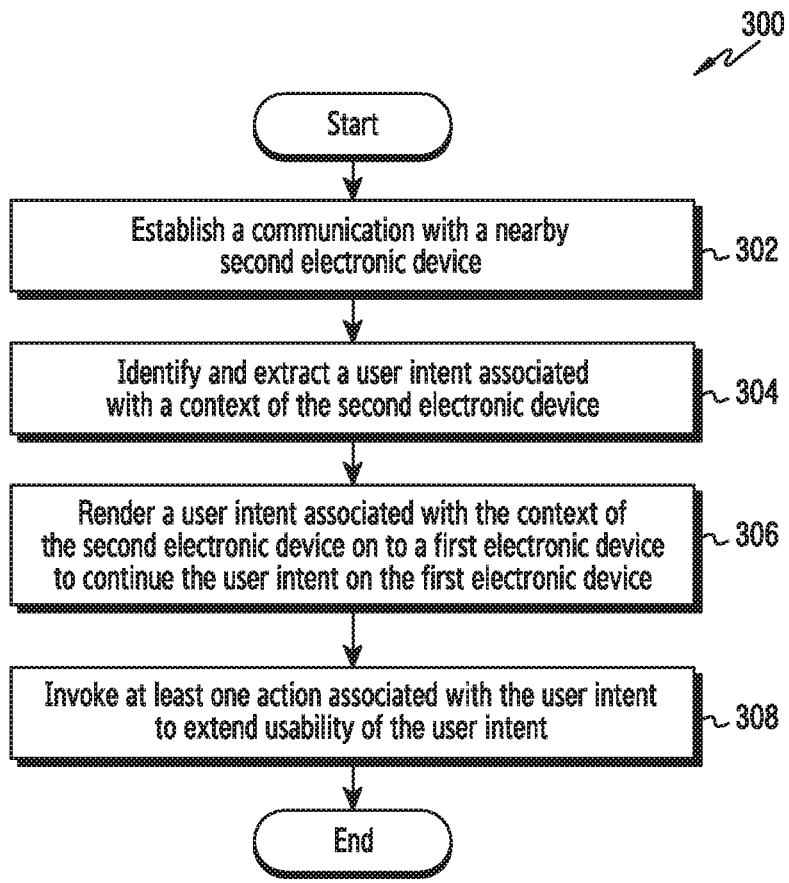
FIG. 3 is a flow diagram illustrating a method for rendering user intent to a first electronic device from a second electronic device, according to various embodiments of the present disclosure.

FIG. 3 is a flow diagram 300 illustrating the operation of a first electronic device 100, according to various embodiments of the present disclosure.

Referring to FIG. 3, at operation 302, the first electronic device 100 establishes a communication with a second electronic device 200. For example, the established communication is a link for short-range communication, like Wi-Fi, Bluetooth, WiGig (wireless gigabit alliance), or BLE. The second electronic device 200 is located near the first electronic device 100. In another example, the established communication is a cellular link like D2D (device-to-device), LTE. The first electronic device 100 detects a gesture performed with the second electronic device 200 to establish a communication with the second electronic device 200. The gesture performed with the second electronic device 200 may be performed in proximity with the first electronic device 100 The first electronic device 100 controls the gesture detection unit 102 to detect the gesture performed in proximity with second electronic device 200 to establish the communication with the second electronic device 200. In response to detecting the gesture, the first electronic device 100 establishes the communication with the second electronic device 200. According to various embodiments, the first electronic device 100 can receive information associated with a content provided by the second electronic device 200. In example, while the second electronic device 200 executes a certain application to provide the content, the first electronic device 100 receives information regarding the content and information regarding the certain application. In some embodiments, the information associated with the content comprises the information for indicating an application executed by the second electronic device 200 to provide the content.

At operation 304, The first electronic device 100 identifies and extracts a user intent associated with a context associated with the second electronic device 200. The first electronic device 100 controls the user intent rendering unit 104 to identify and extract the user intent associated with the context of the second electronic device 200. As described above in step 302, the first electronic device 100 may obtain the gesture and the information associated with the content provided by the second electronic device 200. The first electronic device 100 identifies an operation expected to be associated with the user intent, based on the gesture and the information associated with the content (hereinafter, content information). In example, the first electronic device 100 identifies the function among a plurality of functions based on the content information. The plurality of functions may be pre-configured according to an application to be executed by the first electronic device 100.

At operation 306, the first electronic device 100 renders the user intent associated with the context of the second electronic device 200 on to the first electronic device 100 to continue the user intent on the first electronic device 100. The first electronic device 100 controls to the user intent rendering unit 104 to render the user intent associated with the context of the second electronic device 200 on to the first electronic device 100 to continue the user intent on the first electronic device 100. Thus, the user can extend the usability to the first electronic device from the second electronic device 200. For example, the first electronic device 100 executes an application associated with an application executed in the second electronic device 200.

At operation 308, the first electronic device 100 invoking one or more actions associated with the user intent to extend usability of the user intent. the first electronic device 100 controls the user intent rendering unit 104 to invoke the one or more actions associated with the user intent to extend usability of the user intent. The actions can be for example, booking a cab, receiving on incoming call, replying to a received message, adding an event reminder to a calendar or the like. For example, the first electronic device 100 executes functions defined in the application executed in the operation 306.

Although the rending of the user intent or the invoking of one or more actions are described as sequential operations, the present disclosure is not limited by that. In the present disclosure, the rending and the invoking operations can be referred as performing operations expected to be associated with the user intent, for example, executing corresponding application, functions, providing services, displaying some objects, and so on.

The various actions, acts, blocks, operations, or the like in the method and the flow diagram 300 may be performed in the order presented, in a different order or simultaneously. Further, in some embodiments, some of the actions, acts, blocks, operations, or the like may be omitted, added, modified, skipped, or the like without departing from the scope of the disclosure.

According to various embodiments, a method of rendering user intent across electronic devices, the method comprises extracting, by a first electronic device (100), a user intent associated with a context of a second electronic device (200), and rendering, by the first electronic device (100), the user intent associated with the context of the second electronic device (200) to continue the user intent on the first electronic device (100).

In one example, the method further comprises invoking, by the first electronic device (100), at least one action associated with the user intent to extend usability of the user intent.

In another example, the extracting of the user intent comprises detecting, by the first electronic device (100), a gesture performed in proximity with the second electronic device (200), and extracting, by the first electronic device (100), the user intent associated with the context of the second electronic device (200) based on the detected gesture.

In yet another example, the user intent is extracted based on a metadata associated with the context of the second electronic device (200).

FIGS. 4A to 4E illustrate examples of rendering user intent associated with the second electronic device (e.g., a smart watch) to a first electronic device (e.g., a smartphone), according to various embodiments of the present disclosure.

Figure 4A:
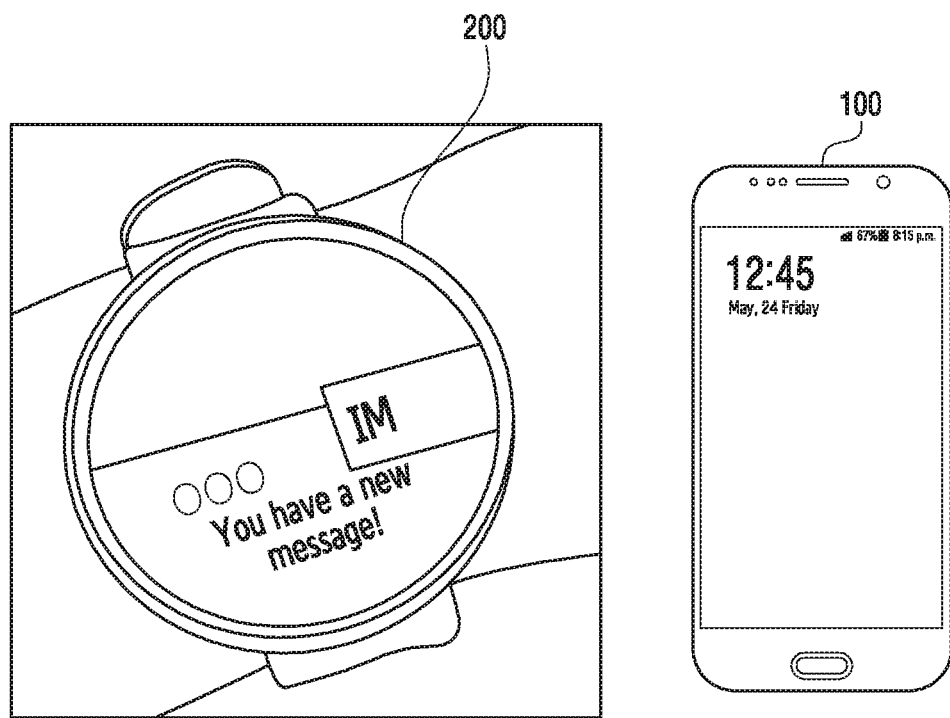
FIGS. 4A, 4B, 4C, 4D, and 4E illustrate examples of rendering user intent associated with a second electronic device (e.g., a smart watch) to a first electronic device (e.g., a smartphone), according to various embodiments of the present disclosure.
Figure 4B:
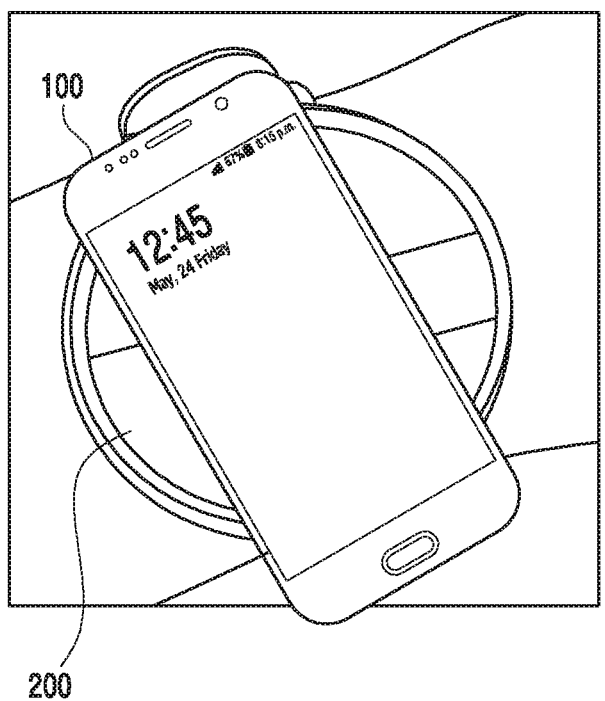
Figure 4C:
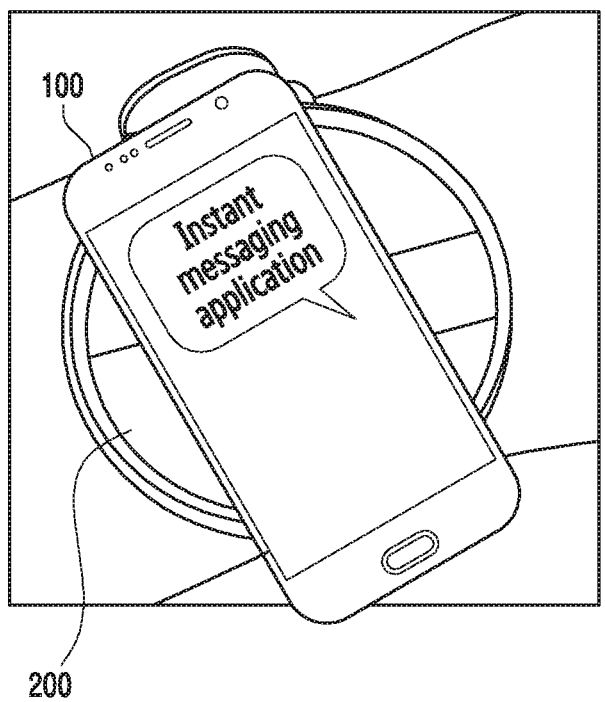
Figure 4D:
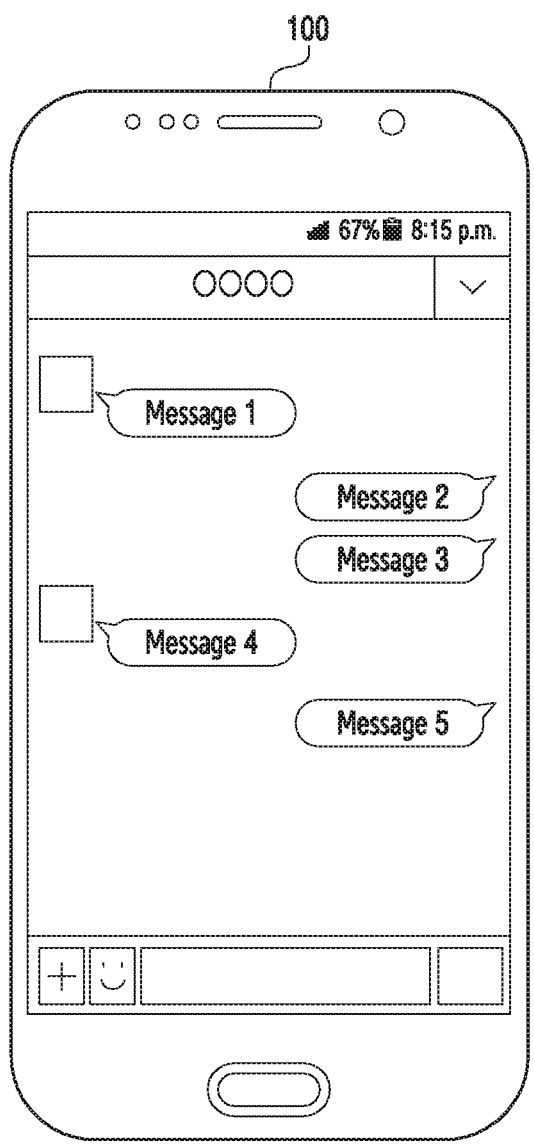

Referring to FIG. 4A, a second electronic device 200 and first electronic device 100 present in proximity with each other. The second electronic device 200 may receive a message notification, for that the user wishes to reply from the first electronic device 100. Therefore, the user performs a gesture towards the second electronic device 200, for example, the user may hover over the first electronic device 100 on the second electronic device 200 as shown in FIG. 4B, to identify the user intent associated with second electronic device 200. The user intent can be extracted based on the context/metadata associated with the message notification as shown in FIG. 4C. Further, the first electronic device 100 can be configured to render the user intent (For example, launching a messaging application from the message notification) as shown in FIG. 4D. Thus, the user can reply to the message received on the second electronic device 200 using the first electronic device 100, so that the usability can be extended from the second electronic device 200 to the first electronic device 100.

Figure 4E:
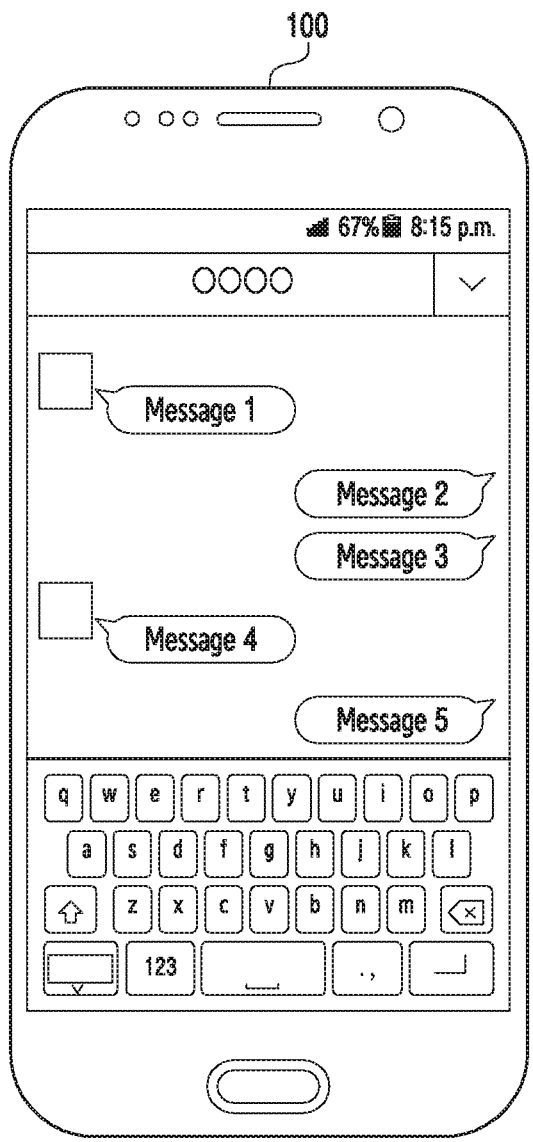

Through FIG. 4A to 4D, the message application is launched. In some embodiments, the first electronic device 100 performs at least one additional function in addition to executing an application in response to detecting the gesture performed by the second electronic device 200. The additional function is a function to be expected to be performed in the second electronic device 200 or a function being performed by the second electronic device 200. For example, as shown in FIG. 4E, the first electronic device 100 is configured to display a software (SW) keyboard in addition to executing the message application. The SW keyboard is displayed automatically in response to detecting the gesture. The displaying of the SW keyboard and the executing of the message application are performed as one step. As the keyboard is being displayed without a user input, the user of the first electronic device 100 may be convenient. Also, operations to be performed or being performed in the second electronic device 200 can be continuously performed by the first electronic device 100.

Figure 5A:
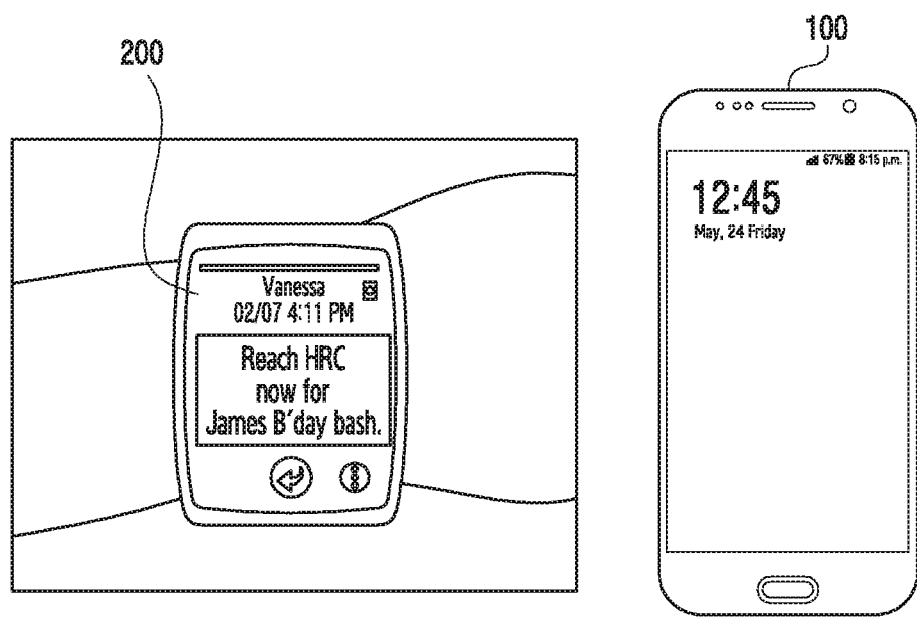
FIGS. 5A, 5B, and 5C illustrate examples of rendering a cab booking application with pre-populated source and destination locations to a first electronic device (e.g., a smartphone) based on a notification message received on a second electronic device (e.g., a smart watch), according to various embodiments of the present disclosure.
Figure 5B:
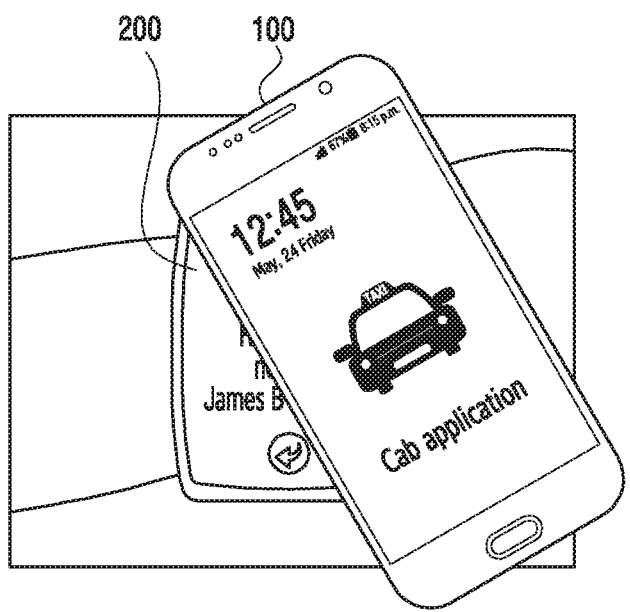
Figure 5C:
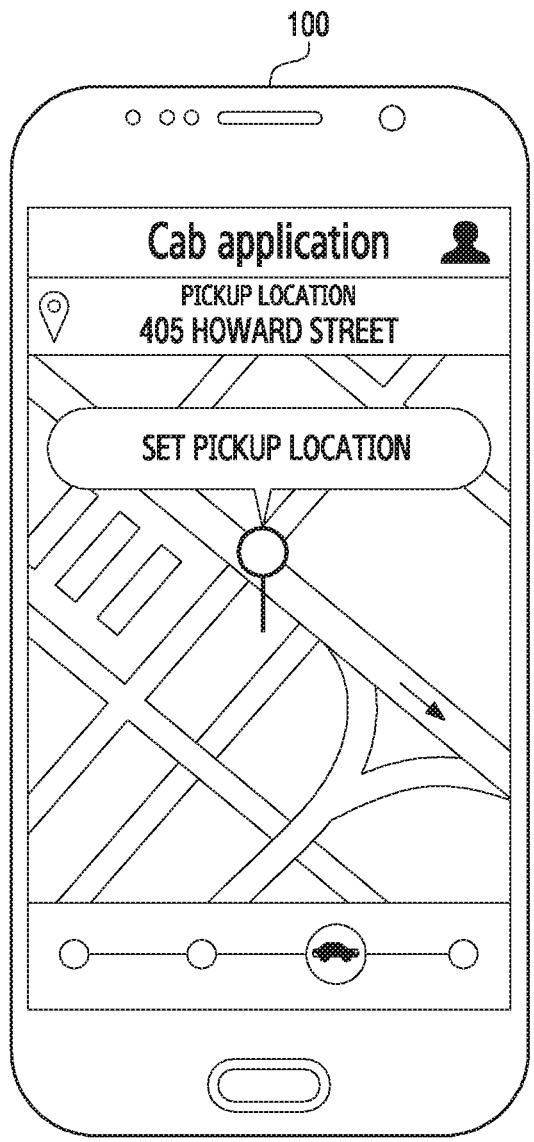

FIGS. 5A to 5C illustrate examples of rendering a cab booking application with pre-populated source and destination locations to a first electronic device based on the notification message received on the second electronic device 200, according to various embodiments of the present disclosure.

Referring to FIG. 5A, a second electronic device 200 and first electronic device 100 present in proximity with each other. The second electronic device 200 may receive a text message notification, wherein the text message includes an invitation to attend James birthday bash at hard rock cafe (HRC). Based on the received message on the second electronic device 200, the user would like to book a cab from his place to the HRC from the first electronic device 100. Therefore, the user performs the gesture towards the second electronic device 200, for example, the user may hover over the first electronic device 100 on the second electronic device 200 as shown in FIG. 5B, to identify and extract the user intent associated with second electronic device 200. The user intent can be extracted based on the context/metadata associated with the text message notification as shown in FIG. 5B. Further, the first electronic device 100 can configured to render the user intent (i.e., a cab booking application with pre-populated source and destination locations extracted from the text message received on the second electronic device 200) extracted based on the context/metadata associated with the text message as shown in FIG. 5C. Thus, the user can book the cab using the first electronic device 100 by extracting the context/metadata associated with the text message received on the second electronic device 200.

Although not shown in FIGS. 5A-5C, in some embodiments the first electronic device 100 may perform at least one additional function in addition to executing the cap booking application. For example, the first electronic device 100 performs a booking of a cab with setting a destination. The first electronic device 100 receives information regarding the destination from the second electronic device 200. Therefore, the user does not need to set the destination for the booking. By the destination is set automatically, unnecessary input can be reduced. Furthermore, before requesting cab services to a taxi driver, a confirm message may be displayed to confirm again whether or not to request the cab services as the destination set automatically.

Figure 6A:
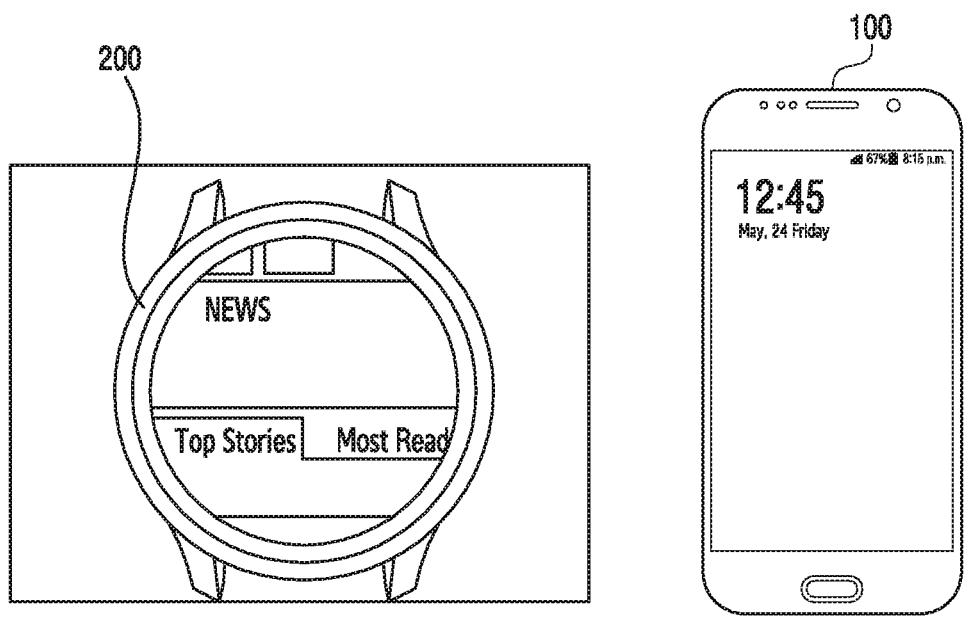
FIGS. 6A, 6B, and 6C illustrate examples of rendering a news application from a second electronic device (e.g., smart watch) to a first electronic device (e.g., a smartphone), according to various embodiments of the present disclosure.
Figure 6B:
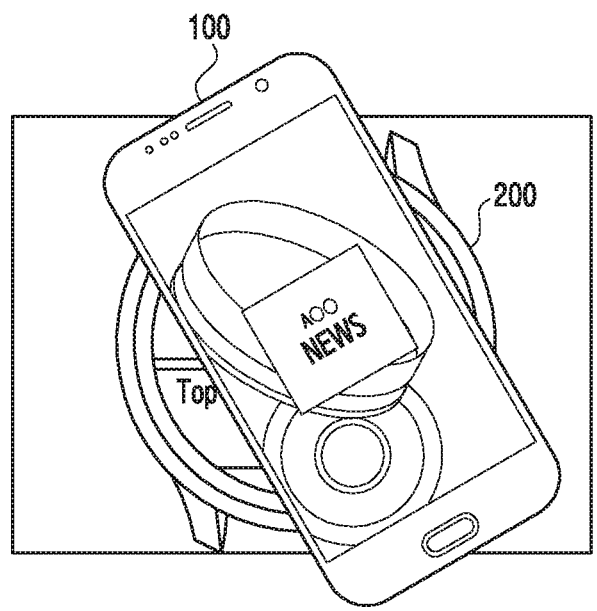
Figure 6C:
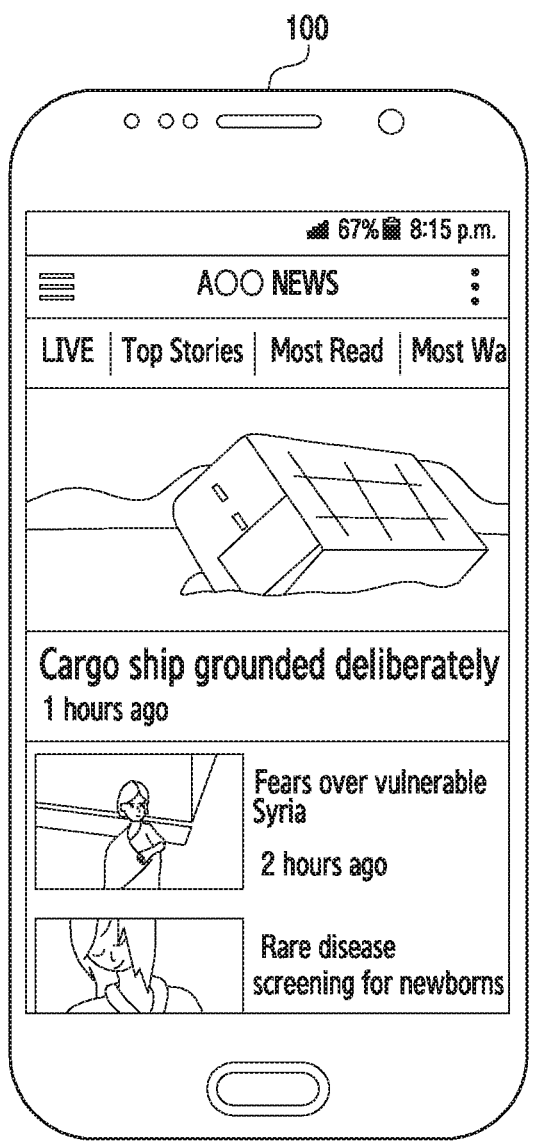

FIGS. 6A to 6C illustrate examples of rendering a news application from the second electronic device 200 to the first electronic device 100, according to various embodiments of the present disclosure.

Referring to FIG. 6A, the second electronic device 200 and the first electronic device 100 present in proximity with each other. Initially, a user is browsing information in a news application in the second electronic device 200, however the user finds difficult to read the information available in the news application because of small display size. Thus, the user wants to render news application from the second electronic device 200 to the first electronic device 100. Therefore, the user performs a gesture towards the second electronic device 200, for example, the user may hover over the first electronic device 100 on the second electronic device 200 as shown in FIG. 6B to establish a communication with second electronic device 200, to identify the user intent (i.e., related information associated with the information browsing on the news application) associated with the second electronic device 200. Further, the first electronic device 100 can be configured to extract the user intent based on the context/metadata associated with the news application. Further, the first electronic device 100 can be configured to render the quick links to related information associated with the information browsing on the news application as shown in FIG. 6C. Thus, the user can extend usability from the second electronic device 200 to the first electronic device 100. In other words, as shown in FIG. 6C, the first electronic device 100 launches the news application and displays a view related to a view of the second electronic device 200. For example, when the second electronic device 200 displays articles about indigents/accidents, the first electronic device 100 displays a detail view (i.e. photo view, comment view, full view) of the articles in response to detecting the gesture of the second electronic device 200. The executing of the news application and displaying the view regarding the user intent can be performed as one step in response to detecting the gesture. By displaying the certain view automatically as the user intent, the user can continue to work or to get services by the second electronic device 200.

Figure 7A:
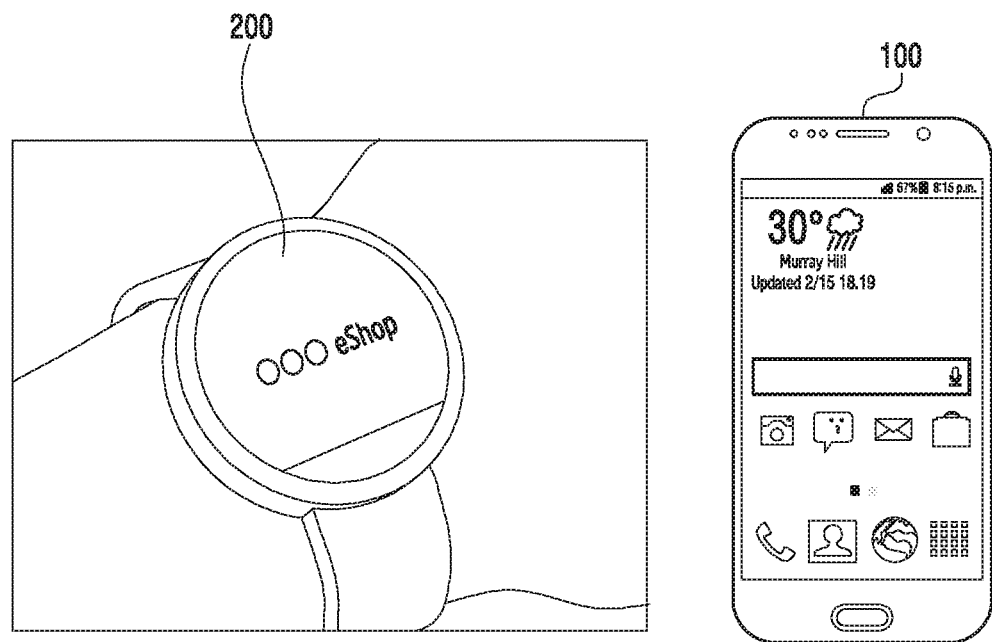
FIGS. 7A, 7B, and 7C illustrate examples of rendering a price comparison of a product from different shopping sites on a first electronic device (e.g., a smartphone) based on a product being accessed on a shopping application associated with the second electronic device (e.g., a smart watch), according to various embodiments of the present disclosure.
Figure 7B:
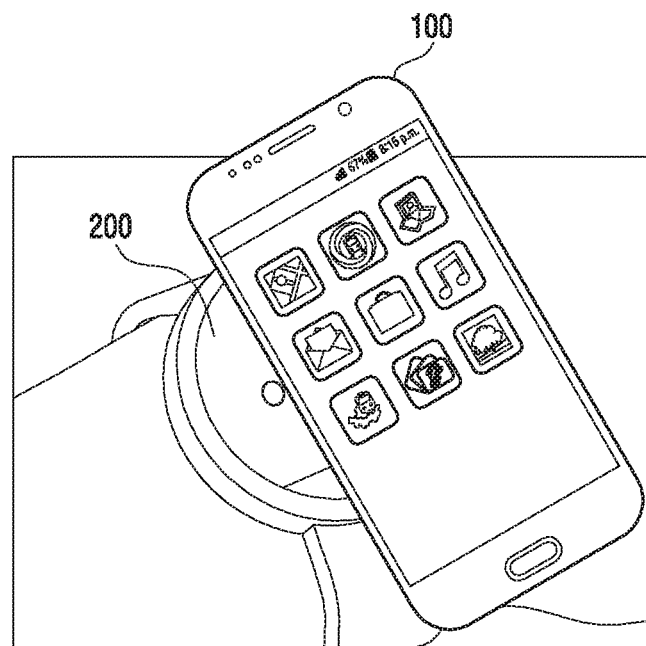
Figure 7C:
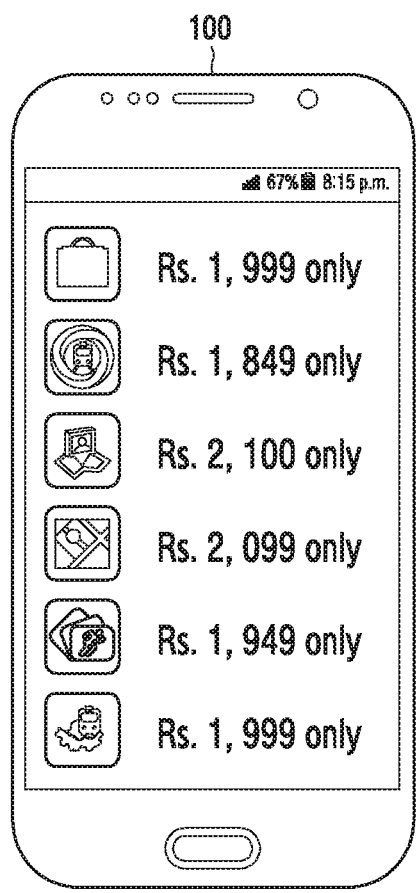

FIGS. 7A to 7C illustrate examples of rendering a price comparison of a product from different shopping sites on a first electronic device 100 based on a product being accessed on a shopping application associated with the second electronic device 200, according to various embodiments of the present disclosure.

Referring to FIG. 7A, the second electronic device 200 and first electronic device 100 present in proximity with each other. The user of the second electronic device 200 accessing a product in the shopping application associated with the second electronic device 200. However, the user may wish to see the price comparison of that particular product from different shopping sites. However, the user may find difficult to view the price comparison information, because of small display size. Thus, the user wants to render the user intent (i.e., price comparison information) associated with context of the second electronic device 200 on to the first electronic device 100. Therefore, the user performs a gesture towards the second electronic device 200, for example, the user may hover over the first electronic device 100 on the second electronic device 200 as shown in FIG. 7B to identify the user intent associated with shopping application displayed in the second electronic device 200. The user intent can be extracted based on a metadata associated with the context of the shopping application. Further, the first electronic device 100 can configured to render the user intent associated with the shopping application as shown in FIG. 7C. The user intent includes price comparison of the product being accessed by the user in the second electronic device 200. Thus, the user can extend usability from the second electronic device 200 to the first electronic device 100.

More specifically, the information related to the product has been provided to a user by the second electronic device 200. The second electronic device 200 transmits the information related to the product to the first electronic device 100. And, the first electronic device 100 launches the shopping application and next, displays a page for the price comparison of the product. By performing the launching of the application and the displaying of the page as one step, the user can easily carry shopping as like purchase or add to a shopping list. In other words, according to various embodiments, the first electronic device 100 continues to execute actions, which has been performed by the second electronic device 200. The action(s) has been performed by the second electronic device before a communication link between the first electronic device 100 and the second electronic device 200 is established by the gesture.

Figure 8A:
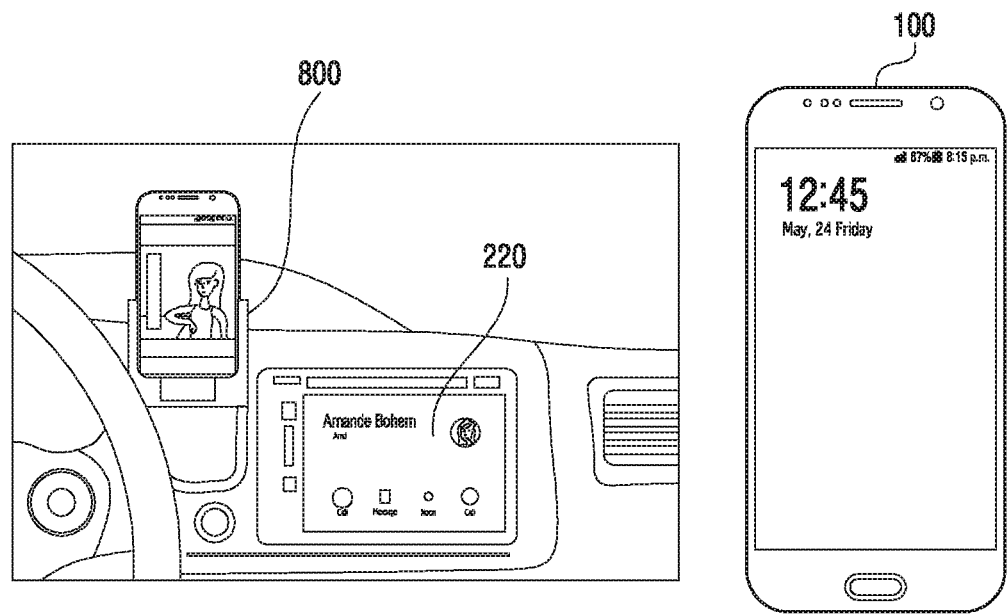
FIGS. 8A, 8B, and 8C illustrate examples of rendering user intent associated with a vehicle infotainment system to a nearby first electronic device (e.g., smartphone), according to various embodiments of the present disclosure.
Figure 8B:
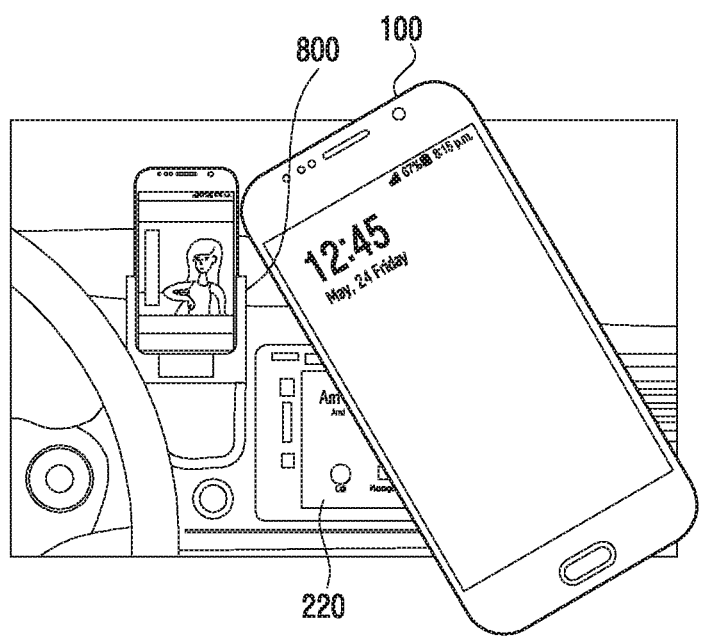
Figure 8C:
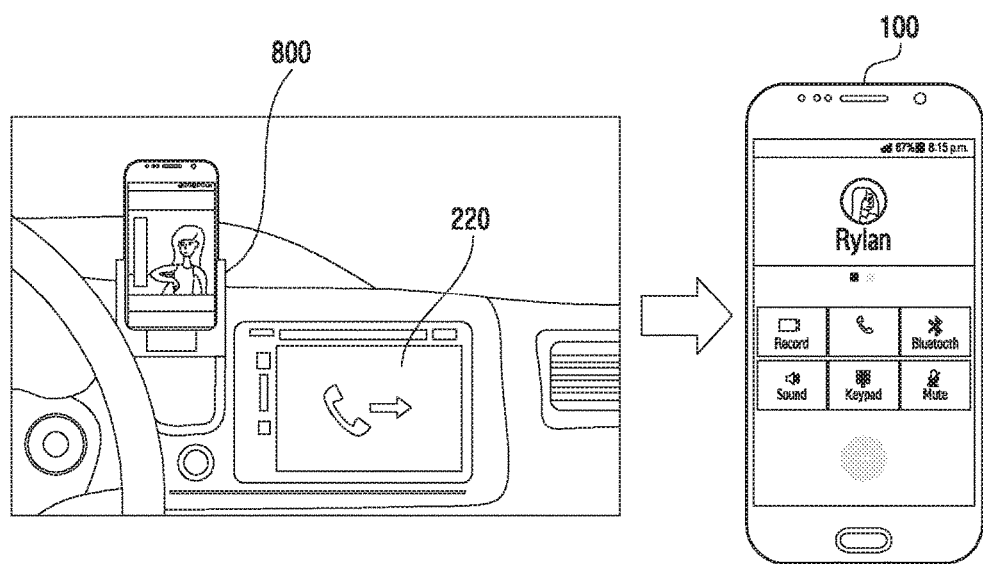

FIGS. 8A to 8C illustrate examples of rendering user intent associated with a vehicle infotainment system 220 to a nearby first electronic device 100, according to various embodiments of the present disclosure.

Referring to FIG. 8A, a first electronic device (e.g., smartphone) 100 is docked in a dock 800 connected to the vehicle infotainment system/vehicle head unit 220. A user/front passenger may receive a personal incoming call on a first electronic device 100 connected to the vehicle infotainment system 220 as shown in FIG. 8A. However, the personal incoming call is irrelevant to rear passengers, thus the user avoids talking on a loud speaker of the vehicle infotainment system 220. However, the user wants to extend the incoming call to the first electronic device 100, thus the user performs a gesture towards the vehicle infotainment system 220 as shown in FIG. 8B, to extend the personal incoming call from the vehicle infotainment system 220 to the first electronic device 100 as shown in FIG. 8C to continue the call on the first electronic device 100.

Figure 9A:
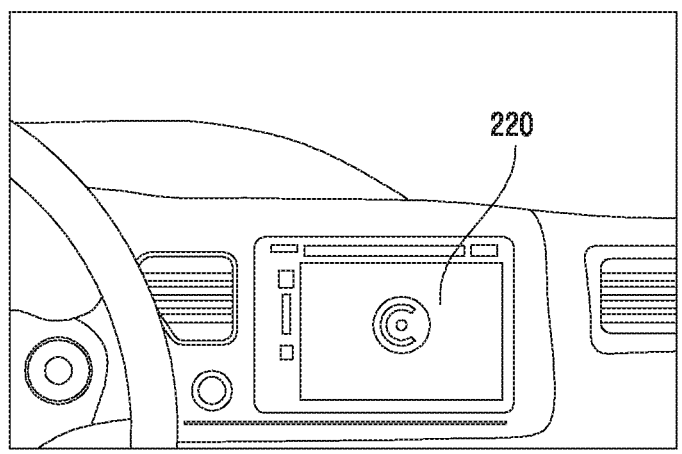
FIGS. 9A, 9B, and 9C illustrate examples of rendering/extending usability of a first electronic device (e.g., a smartphone) to a vehicle infotainment system, according to various embodiments of the present disclosure.
Figure 9B:
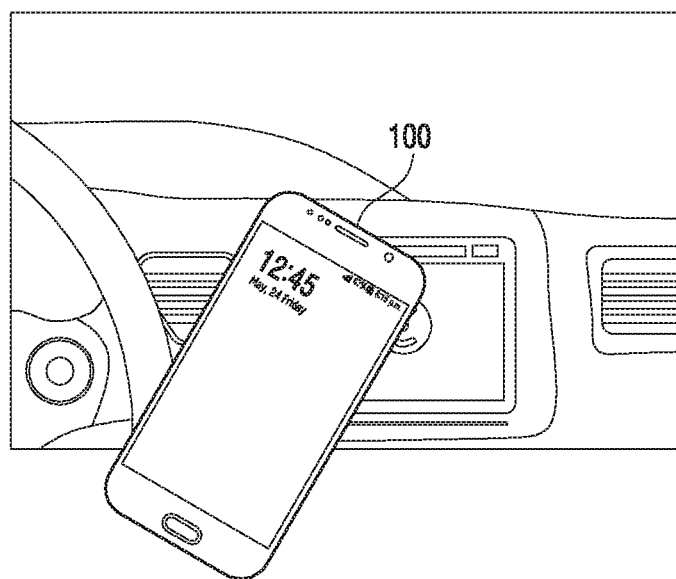
Figure 9C:
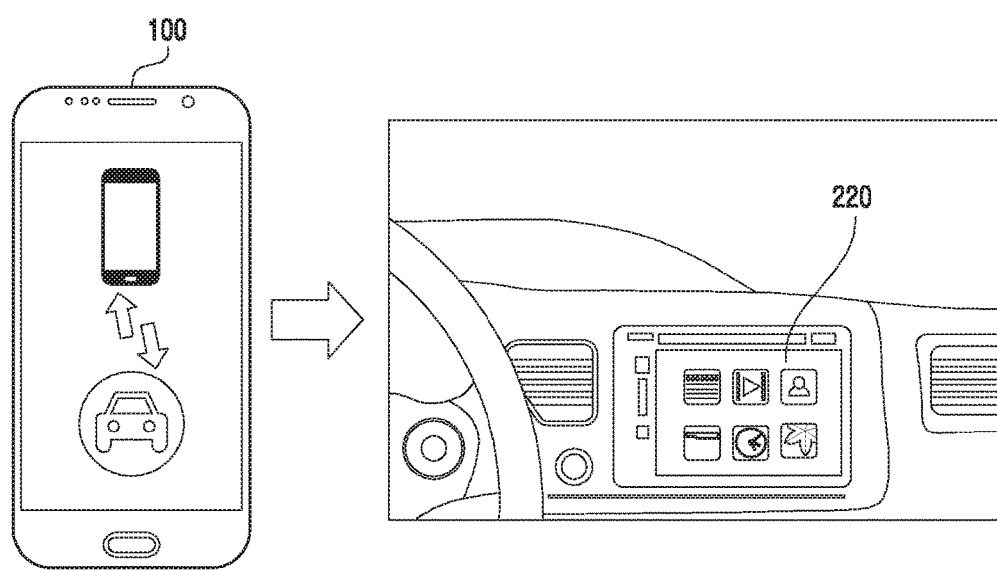

FIGS. 9A to 9C illustrate examples of rendering/extending usability of the first electronic device 100 to the vehicle infotainment system 220, according to various embodiments of the present disclosure.

Referring to FIG. 9A, the vehicle infotainment system/ Vehicle Head Unit 220. Initially, the vehicle infotainment system 220 is not connected to any of the user devices. However, when the user wants to connect the first electronic device 100 to the vehicle infotainment system 220. The user may perform a gesture with the first electronic device 100 towards the vehicle infotainment system 220 (for example, the user may hover over the first electronic device 100 on the vehicle infotainment system 220) to establish a communication with the vehicle infotainment system as shown in FIG. 9B. The vehicle infotainment system 220 detects the gesture performed with the first electronic device 100 and the vehicle infotainment system 220 establishes the communication link between the first electronic device 100 and the vehicle infotainment system 220. Further, the vehicle infotainment system 220 can be configured to identify the user intent associated with the first electronic device 100 to extend the usability of the first electronic device 100 on to the vehicle infotainment system 220 as shown FIG. 9C. In other words, the vehicle infotainment system 220 identifies an operation to establish the communication link (i.e. transmit request signal, identification, connection setup). The operation to connect the first electronic device 100 to the vehicle infotainment system may be determined as the user intent. According to various embodiments the vehicle infotainment system 220 identifies the operation based on the gesture (i.e. toward to the vehicle infotainment system 220) and the information associated with the content provided by the vehicle infotainment system 220 (i.e. basic UI (user interface) or applications associated with the vehicle equipped with vehicle infotainment system 220).

Figure 10A:
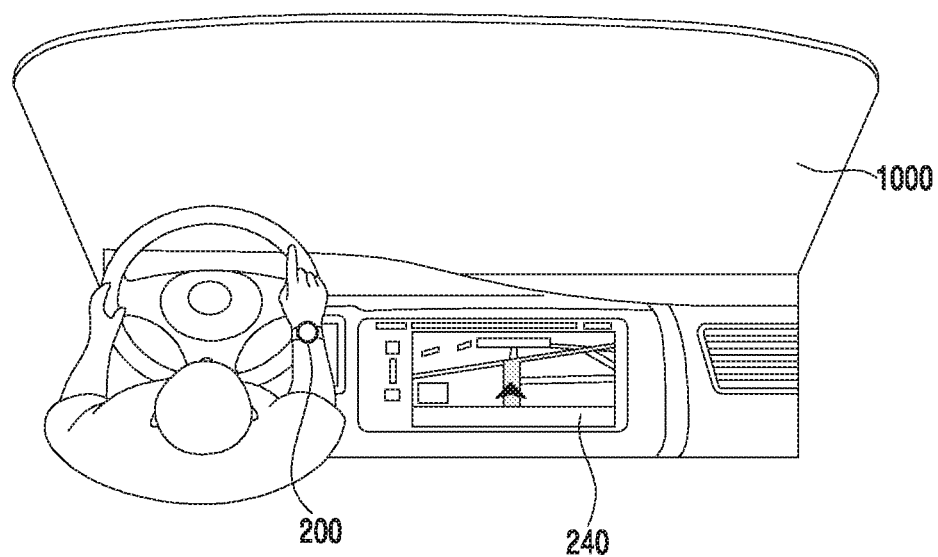
FIGS. 10A, 10B, and 10C illustrate examples of rendering landmarks information along a route on head up display based on a direction of hover of a second electronic device (e.g., smart watch) with respect to either on-board computer or in-vehicle display unit, according to various embodiments of the present disclosure.
Figure 10B:
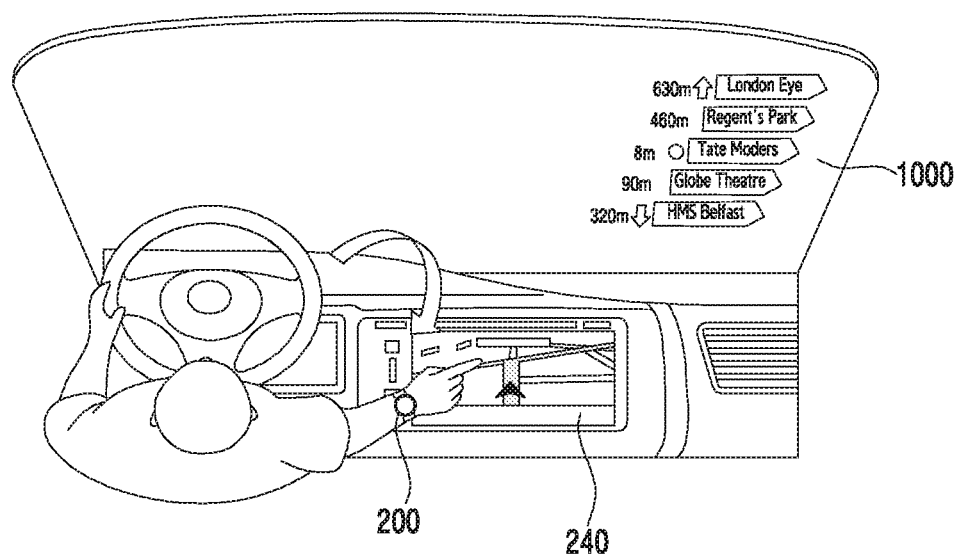
Figure 10C:
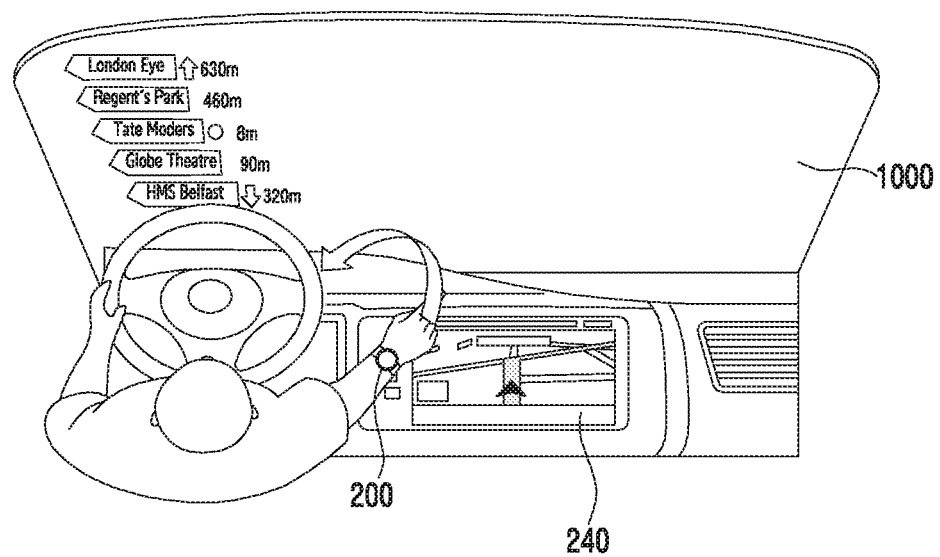

FIGS. 10A to 10C illustrate examples of rendering landmarks information along a route on head up display 1000 based on a direction of hover of a second electronic device 200 with respect to either on-board computer or in-vehicle display unit 240, according to various embodiments of the present disclosure.

The various embodiments herein provide a user with landmarks information along the route considering the user's current location based on the direction of hover (or any custom gesture associated in advance) of the second electronic device 200 with respect to either on-board computer or in-vehicle display unit. When the user hovers the second electronic device 200 near the in-vehicle display unit 240 in a clockwise direction as shown in FIG. 10B, the land mark points can be displayed on the right side of the head up display 1000 as shown in FIG. 10B. However, if the user hovers the second electronic device 200 near the in-vehicle display unit 240 in anti-clockwise direction as shown in FIG. 10C, the land mark points can be displayed on the left side of the head up display 1000 as shown in FIG. 10C.

As described with an example of FIG. 10A-10C, in accordance with various embodiments, the operation identified as the user intent can be different as the detected gesture being different. For example, when a first gesture is detected, the device (like the head up display 1000 or in-vehicle display unit 240) connected with the second electronic device 200 executes a first function. When a second gesture is detected, the device connected with the second electronic device 200 executes a second function. The gestures to be detected and the functions to be executed may be predetermined based on an application.

In some embodiments, the device like in-vehicle display unit 240 transmits control information to another electronic device which is connected with the device like the head up display 1000. The control information is usable for providing the actions associated with the content on the third electronic device.

FIGS. 11 to 14 are example illustrations of rendering user intent on to the first electronic device 100 from the second electronic device 200, according to various embodiments of the present disclosure.

Figure 11:
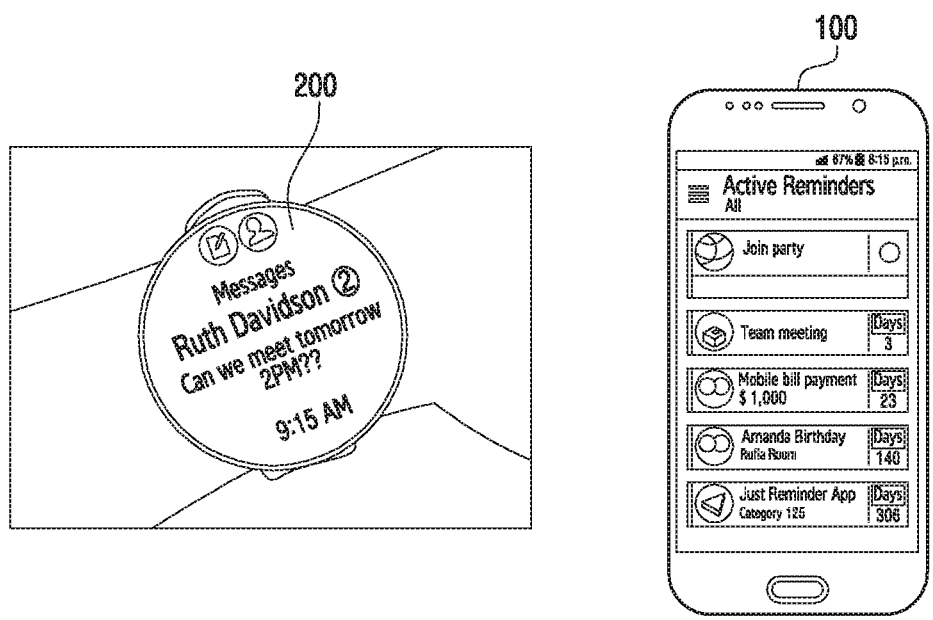
FIGS. 11, 12, 13, and 14 are example illustrations of rendering user intent on to a first electronic device from a second electronic device, according to various embodiments of the present disclosure.

Referring to FIG. 11, the second electronic device 200 and the first electronic device 100, wherein the second electronic device 200 may receive a message notification. The message notification may include a meeting schedule. The user wants to extend the usability of the message notification to the first electronic device 100. Therefore, the user performs a gesture with the first electronic device 100 towards the second electronic device 200 to establish a connection with the second electronic device 200. The first electronic device 100 detects the gesture with the second electronic device 200 and establishes the connection with the second electronic device 200. Further, the first electronic device 100 can be configured to identify and extract the user intent associated with the second electronic device 200 based on the context associated with message notification. The first electronic device 100 receives information associated with the message notification. The first electronic device 100 identifies an operation expected as the user intent based on the information. Further, the first electronic device 100 can be configured to render the user intent, wherein the user intent includes launching the calendar application and intelligently opens a day schedule and displays empty slots, where the meeting schedule is automatically added to the calendar of events to provide active reminders to the user as shown in FIG. 11. Although not shown in FIG. 11, The first electronic device 100 identifies the operation expected as the user intent based on the information and the gesture. In example, the operation may be identified and specified according to the detected gesture. When the gesture is detected in which the second electronic device 200 is near to the first electronic device 100, the first electronic device 100 launches the calendar application. When the gesture in which the second electronic device 200 is turned over from the first electronic device 100 (it means that the user's hand grips the first electronic device 100) is detected, the first electronic device 100 launches the message application to reply the received message notification.

Figure 12:
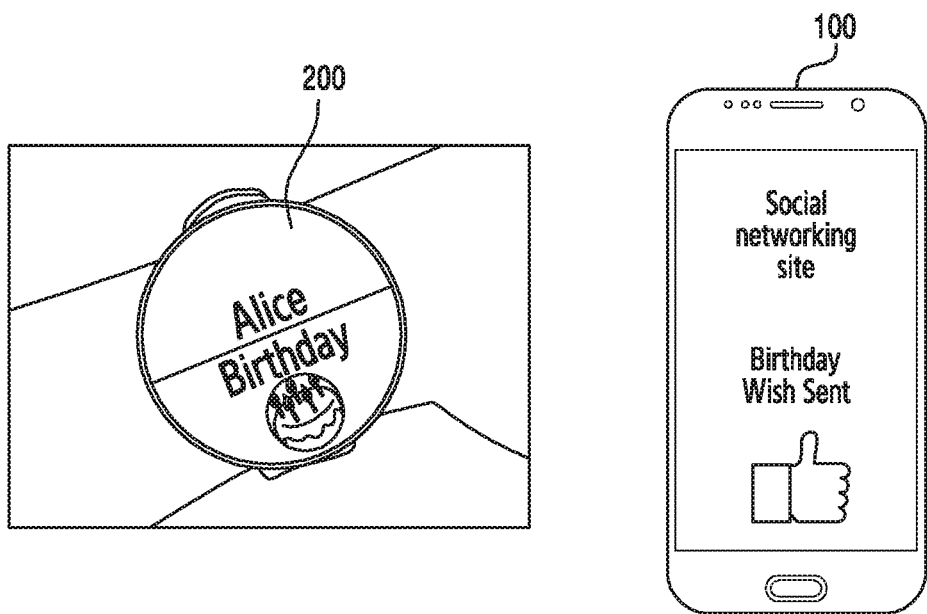

Referring to FIG. 12, the second electronic device 200 and the first electronic device 100, wherein the second electronic device 200 may receive a birthday message notification. However, the user wants to post a birthday wish on social media through first electronic device 100. The user performs a gesture with the first electronic device 100 towards the second electronic device 200 to establish communication with the smart watch 200. Further, the first electronic device 100 can be configured to identify and extract the user intent (launching the social media application on the first electronic device 100 based on the context/ metadata associated with the message notification) associated with the second electronic device 200. Further, the first electronic device 100 can be configured to render the user intent on the first electronic device 100 and automatically post the birthday wish on the social media through the first electronic device 100 as shown in FIG. 12.

Figure 13:
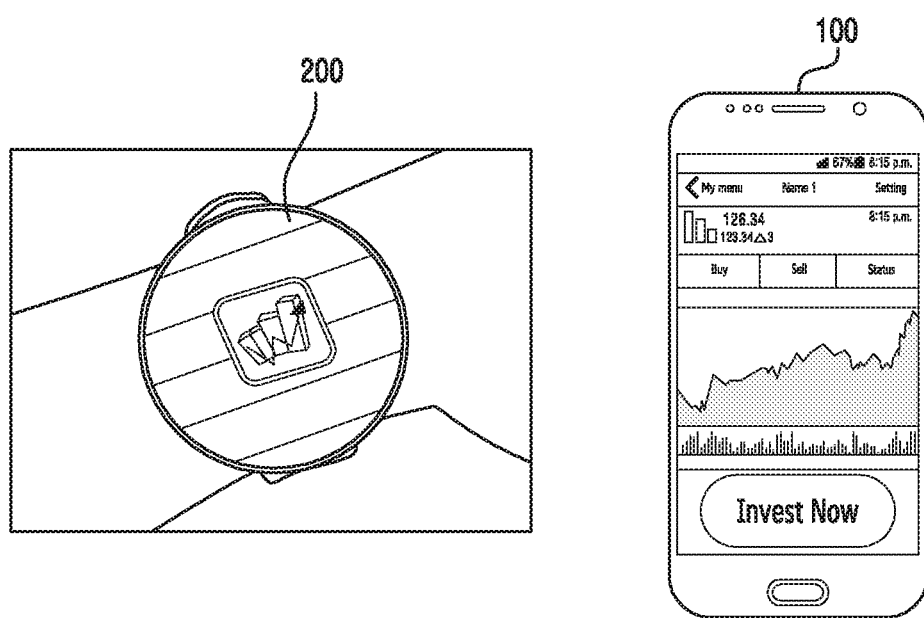

Referring to FIG. 13, the second electronic device 200 and the first electronic device 100, wherein the second electronic device 200 may receive a stock market message notification. However, the user wants to see the stock analysis on the first electronic device 100. The user performs a gesture with the first electronic device 100 towards the second electronic device 200 to establish communication with the second electronic device 200. Further, the first electronic device 100 can be configured to identify and extract the user intent (launching the stock market application and display stock analysis and trends) associated with the second electronic device 200 based on the context/metadata associated with the stock market message notification. Further, the first electronic device 100 can be configured to automatically render the stock market analysis and trends on the first electronic device 100 as shown in FIG. 13. In various embodiments, the first electronic device 100 performs an additional action related to an action of the second electronic device 200. In example, when the second electronic device 200 displays a stock of a certain company, the first electronic device 100 displays a user interface to provide options regarding the stock of the certain company (i.e. sell the stocks, purchase the stocks) on the stock market application.

Figure 14:
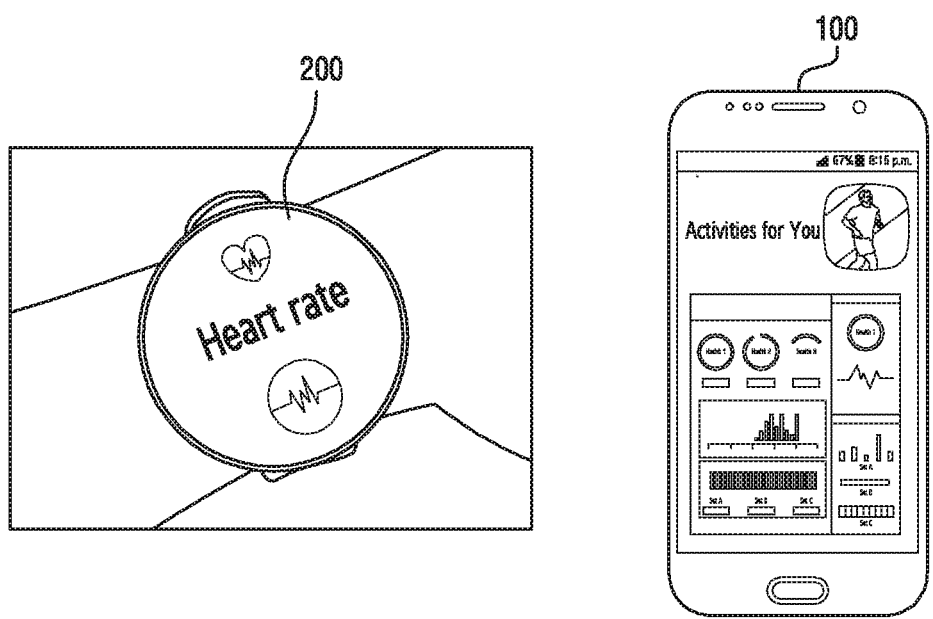

Referring to FIG. 14, the second electronic device 200 and the first electronic device 100, wherein the second electronic device 200 may detect information associated with a user of the first electronic device 100. The information associated with the user comprises at least one of health information or exercises information. For example, the health information comprises a hearth rate or Oxygen saturation. Also, for example, the exercises information includes information associated with operations like running, walking, climbing, or swimming. However, the user wants to see the information associated with the user on his nearby first electronic device 100. The user performs a gesture with the first electronic device 100 towards the second electronic device 200 to establish communication with the second electronic device 200. Further, the first electronic device 100 can be configured to identify and extract the user intent (i.e. launching the health care application and display hearth rate and the running distance) associated with the second electronic device 200 based on the information associated with the user (i.e. health data) obtained by the second electronic device 200. Further, the second electronic device 200 can be configured to automatically record health data (i.e. the hearth rate measured by the second electronic device 200) or provide the health data on the second electronic device 200 as shown in FIG. 14.

Figure 15:
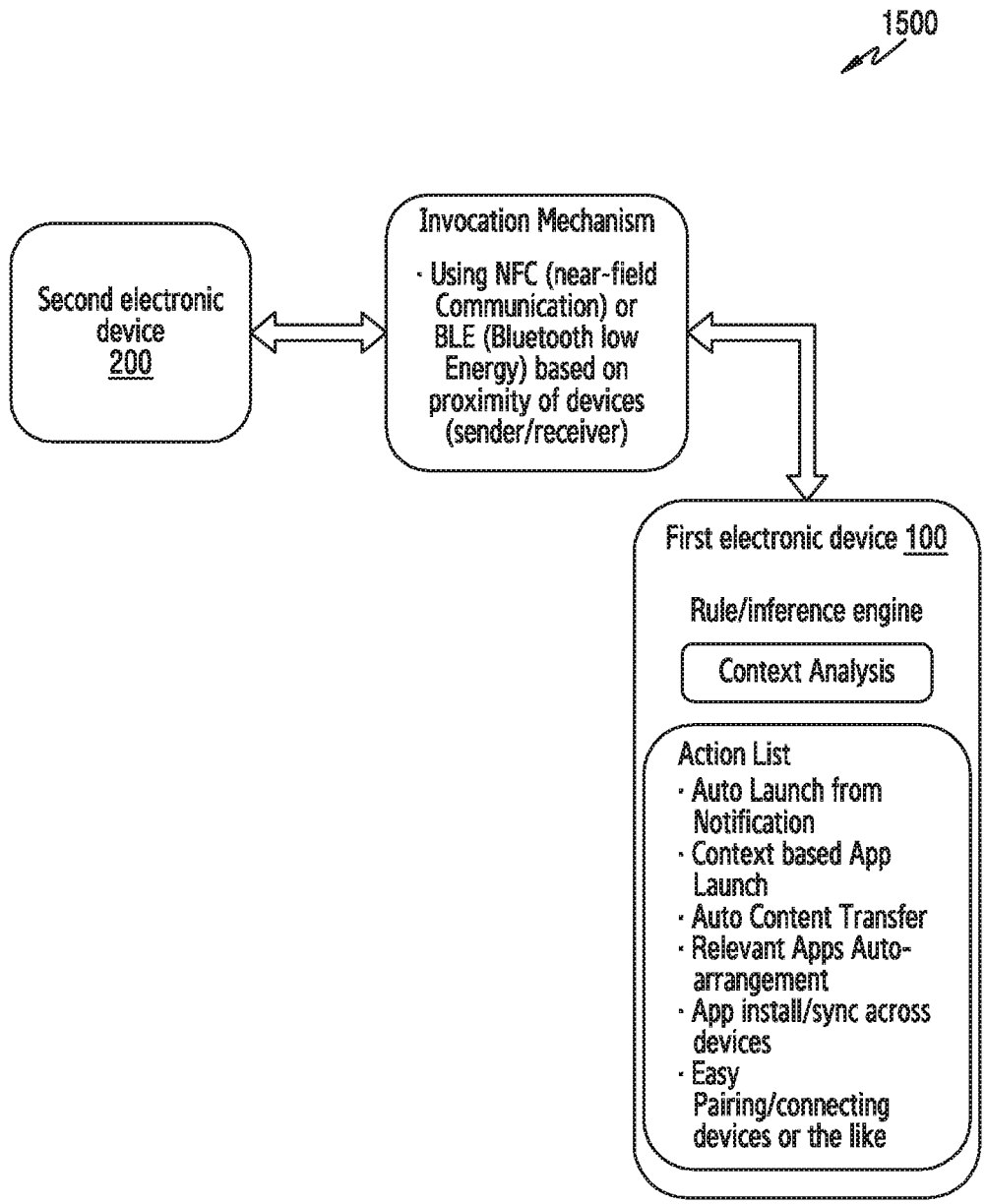
FIG. 15 is an example system diagram illustrating a method of rendering user intent to a first electronic device from a second electronic device, according to various embodiments of the present disclosure.

FIG. 15 is an example system diagram illustrating a method of rendering user intent to the first electronic device 100 from the second electronic device 200, according to various embodiments of the present disclosure.

Referring to FIG. 15, a system 1500 includes the first electronic device/receiver device (for example, a smartphone) 100 and the second electronic device/sender device (for example, a smart watch) 200. The system 1500 can be configured to render application/data between the first electronic device 100 and the second electronic device. Initially, the first electronic device 100 and the second electronic device 200 are in their own initial specific state or context. The first electronic device 100 can be configured to establish a communication between the second electronic devices 200. The first electronic devices 100 can be configured to detect a gesture performed in proximity with the second electronic device 200 to establish/invoke a communication with the second electronic device 200. The first electronic device and the second electronic device are in proximity with each other. The communication can be established trough a suitable communication mechanism such as NFC, Bluetooth, BLE or any other known and supported communication mechanisms. Further, a rule engine associated with the first electronic device 100 can be configured to perform a context analysis to identify a user intent/context associated with the second electronic device 200 to render the user intent on to the first electronic device 100 to perform one or more actions. For examples, the actions can be, but not limited to, auto launch of an application from a notification, context based application launch, auto content transfer, relevant apps auto-arrangement, application installation/synchronization, easy pairing/connecting devices and so on. The available actions can be configured, as required. The user can also select an action if required.

Figure 16:
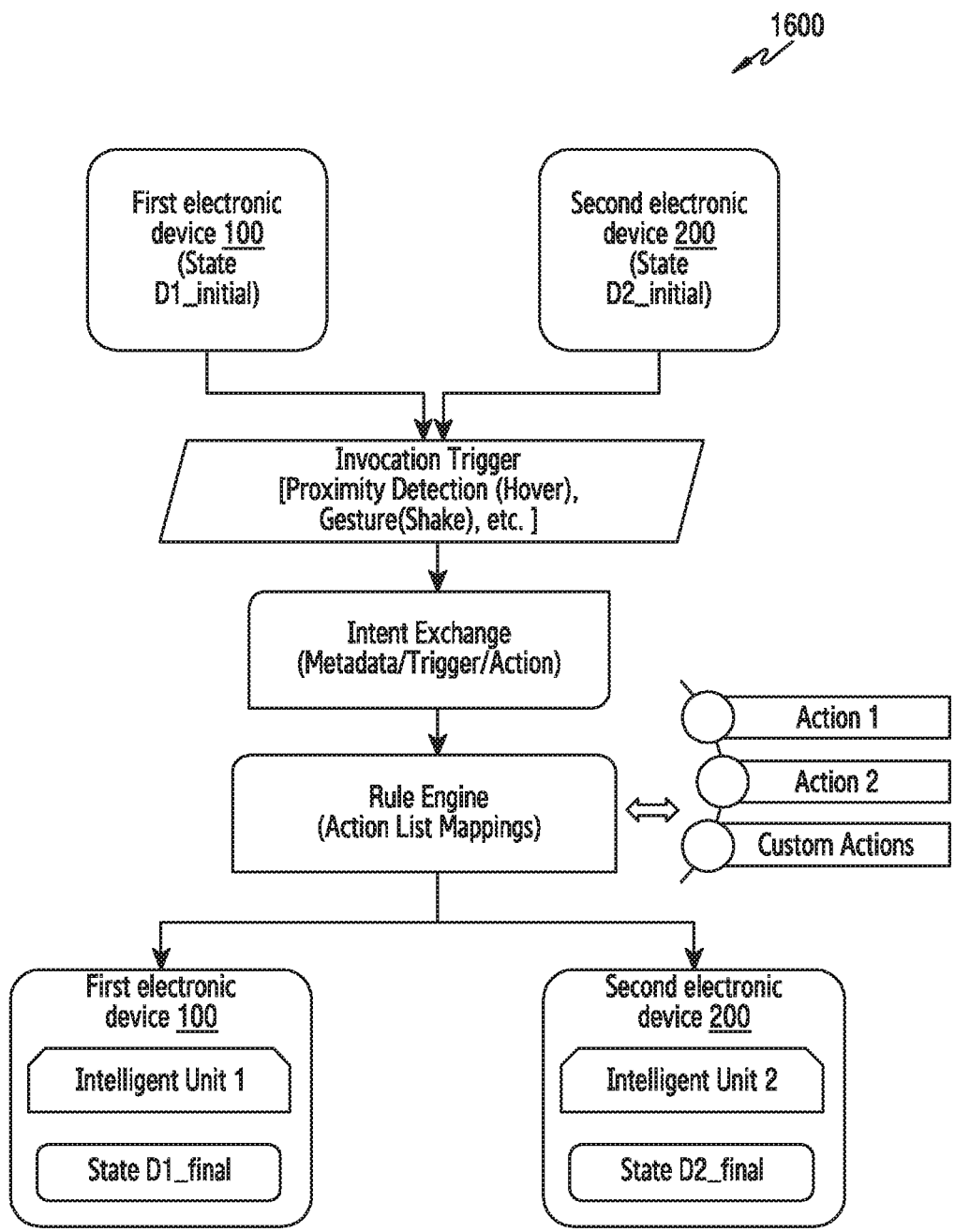
FIG. 16 is a flow diagram illustrating a method of rendering user intent to a first electronic device from a second electronic device, according to various embodiments of the present disclosure.

FIG. 16 is a flow diagram 1600 illustrating a method of rendering user intent to the first electronic device 100 from the second electronic device 200, according to various embodiments of the present disclosure.

Referring to FIG. 16, the first electronic device 100 and the second electronic device 200 are in their own initial specific state or context. Further, an invocation mechanism (for example, proximity detection mechanism such as hovering, a predefined gesture or the like) can be triggered to establish a communication between the first electronic devices 100 and the second electronic device 200. The first electronic devices 100 can be configured to invoke the second electronic device 200 by performing a gesture towards the second electronic device 200 to establish a communication with the second electronic device 200. Once the communication established between the first electronic device 100 and the second electronic device 200, the first electronic device 100 can be configure to identify and extract the user intent associated with the second electronic device 200. The user intent can be extracted based on metadata and context associated with the second electronic device 200. Further, the rules engine associated with the first electronic device 100 can be configured to perform an action based on the rendered user intent to map the initial state of the first electronic device 100 to a final state (State D1 final). Similarly, the initial state of the second electronic device 200 can be mapped to a final state (State D2 final).

Figure 17:
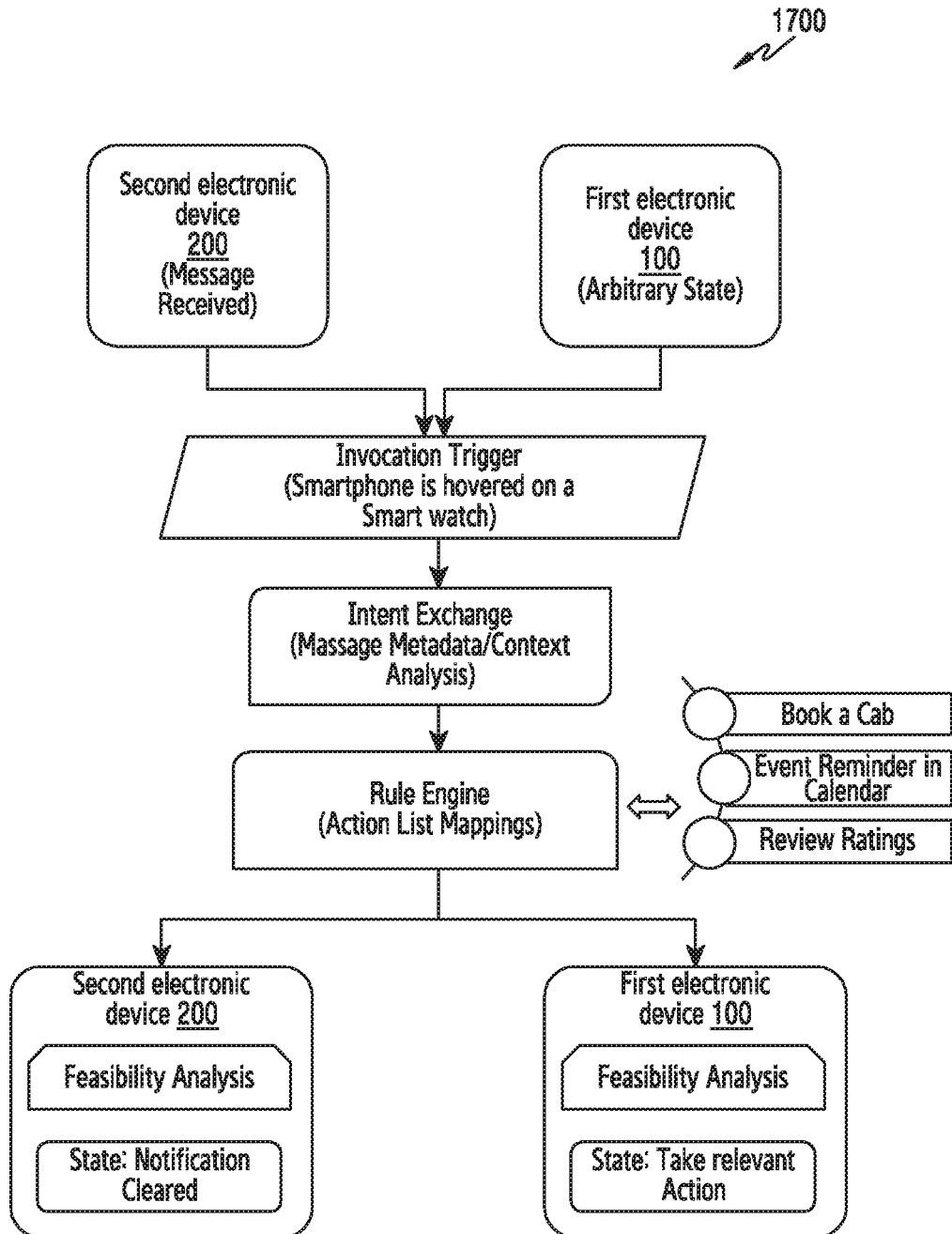
FIG. 17 is an example flow diagram illustrating a method of rendering user intent to a first electronic device (e.g., a smartphone) from the second electronic device (e.g., smart watch), according to various embodiments of the present disclosure.

FIG. 17 is an example flow diagram 1700 illustrating a method of rendering user intent to the first electronic device 100 (e.g., a smartphone) from the second electronic device 200 (e.g., a smart watch), according to various embodiments of the present disclosure.

Referring to FIG. 17, the first electronic device 100 may be in an arbitrary state and the second electronic device 200 may have received a message notification. However, the user wants to extend the usability of the second electronic device 200 on to the first electronic device 100. Therefore, the first electronic device 100 can be configured to initiate an invocation mechanism (for example, proximity detection mechanism such as hovering, a predefined gesture or the like) to establish a communication between the first electronic device 100 and the second electronic device 200. Once the communication established between the first electronic device 100 and the second electronic device 200, the first electronic device 100 can be configure to identify and extract the user intent associated with the second electronic device 200. The user intent can be extracted based on message metadata and context analysis. Further, the first electronic device 100 can be configured to render the user intent associated with the second electronic device 200 to continue the user intent on the first electronic device 100. Further, a rule engine can be configured to map the initial state of the first electronic device to at least one action (for example, booking a cab, event reminder in calendar, review ratings or the like). Further, the first electronic device 100 can perform according to the mapped actions. The initial state of the second electronic device 200 can also be changed to the final state by clearing the received message notification.

As described above, in the present disclosure, the first electronic device 100 provides user convenience by an interaction between the first electronic device 100 and the second electronic device 200. According to various embodiments, the first electronic device 100 launches a first application and performs at least one additional function on the first application in response to detecting a trigger (i.e. a gesture, a proximity, any predetermined actions) related to the second electronic device 200. In some embodiments, the launched first application is related to the second application executed by the second electronic device 200. In some embodiments, the at least one additional function is a function expected to be performed or a function being performed by the second electronic device. The first electronic device 100 receives the information regarding the at least one additional function. For example, when the second electronic device 200 displays a notification of message arrival and the first electronic device 100 detects that the second electronic device 200 is approaching to the first electronic device 100, the first electronic device 100 establishes with the second electronic device 200 and receives information regarding the notification. The first electronic device 100 launches the message application and performs at least one function related to the notification. As described above, the function which has been performed by the second electronic device is continuously performed by the first electronic device 100. Also, by performing the additional function, the user can get seamlessly services.

The various embodiments disclosed herein can be implemented through at least one software program running on at least one hardware device and performing network management functions to control the elements. The elements shown in FIGS. 2A and 2B can be at least one of a hardware device, or a combination of one or more hardware devices and one or more software modules.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating a first electronic device, the method comprises:
   in response to detecting a gesture performed with a second electronic device, receiving information associated with a content provided by the second electronic device;
   in response to receiving the information, executing an application based on the information associated with the content; and
   in response to executing the application, performing a function associated with the content in the application executed on the first electronic device based on the information associated with the content,
   wherein the function is associated with an activity executed in the second electronic device while the gesture is performed.

2. The method of claim 1, wherein the receiving of the information comprises:
   in response to detecting the gesture performed, establishing a communication link with the second electronic device; and
   in response to establishing the communication link, receiving the information associated with the content from the second electronic device by using the communication link.

3. The method of claim 1,
   wherein the function associated with the content comprises displaying a software keyboard to respond to a message on the application,
   wherein the application is a message application,
   wherein the activity is an input for responding to the message, and
   wherein the content is a notification of an arrival of the message.

4. The method of claim 1,
   wherein the information associated with the content comprises:
      information for indicating a related application executed in the second electronic device, the related application being associated with the content, and
      information for indicating the activity executed in the second electronic device, the activity being associated with the content,
   wherein the content is provided by the related application with the activity on the second electronic device while the gesture is performed, and
   wherein the application executed in the first electronic device corresponds to the related application executed in the second electronic device.

5. The method of claim 1, further comprising:
   transmitting control information to another electronic device which is connected with the first electronic device, and
   wherein the control information is usable for providing the function associated with the content on the other electronic device.

6. An apparatus of a first electronic device, the apparatus comprising:
   a memory storing instructions; and
   at least one processor, which when executing the instructions, is configured to:
      in response to detecting a gesture performed with a second electronic device, receive information associated with a content provided by the second electronic device,
      in response to receiving the information, execute an application based on the information associated with the content, and
      in response to executing the application, perform a function associated with the content in the application executed on the electronic device based on the information associated with the content,
   wherein the function is associated with an activity executed in the second electronic device while the gesture is performed.

7. The apparatus of claim 6, wherein the at least one processor, which when executing the instructions, is configured to receive the information by:
   in response to detecting the gesture performed, establishing a communication link with the second electronic device, and
   in response to establishing the communication link, receiving the information associated with the content from the second electronic device by using the communication link.

8. The apparatus of claim 6,
wherein the function associated with the content comprises displaying a software keyboard to respond to a message on the application,
wherein the application is a message application,
wherein the activity is an input for responding to the message, and
wherein the content is a notification of an arrival of the message.

9. The apparatus of claim 6,
wherein the information associated with the content comprises:
information for indicating a related application executed in the second electronic device, the related application being associated with the content, and
information for indicating the activity executed in the second electronic device, the activity being associated with the content,
wherein the content is provided by the related application with the activity on the second electronic device while the gesture is performed, and
wherein the application executed in the first electronic device corresponds to the related application executed in the second electronic device.

10. The apparatus of claim 6,
wherein the at least one processor is further configured to transmit control information to another electronic device which is connected with the first electronic device, and
wherein the control information is usable for providing the function associated with the content on the other electronic device.

11. A non-transitory computer readable medium comprising instructions, which when executed by at least one processor of a first electronic device, causes the at least one processor to:
in response to detecting a gesture performed with a second electronic device, receive information associated with a content provided by the second electronic device;
in response to receiving the information, execute an application based on the information associated with the content; and
in response to executing the application, perform a function associated with the content in the application executed on the first electronic device based on the information associated with the content,
wherein the function is associated with an activity executed in the second electronic device while the gesture is performed.

12. The non-transitory computer readable medium of claim 11, wherein the instructions, which when executed by the at least one processor, further causes the at least one processor to receive the information by:
in response to detecting the gesture performed in proximity with the second electronic device, establishing a communication link with the second electronic device; and
in response to establishing the communication link, receiving the information associated with the content from the second electronic device by using the communication link.

13. The method of claim 1, further comprising:
in response to detecting the gesture performed with the second electronic device, identifying the function corresponding to the activity,
wherein the function is usable for being performed by the second electronic device.

14. The method of claim 1, wherein performing of the function comprises:
performing a first function associated with the content if the detected gesture is a first gesture; and
performing a second function associated with the content if the detected gesture is a second gesture.

15. The method of claim 1, wherein the function is performed automatically in response to detecting the gesture.

16. The apparatus of claim 6,
wherein the at least one processor, when executing the instructions, is further configured to:
in response to detecting the gesture performed with the second electronic device, identify the function corresponding to the activity, and
wherein the function is usable for being performed by the second electronic device.

17. The apparatus of claim 6, wherein the at least one processor, when executing the instructions, is further configured to perform the function by:
performing a first function associated with the content if the detected gesture is a first gesture; and
performing a second function associated with the content if the detected gesture is a second gesture.

18. The apparatus of claim 6, wherein the function is performed automatically in response to detecting the gesture.

19. The non-transitory computer readable medium of claim 11,
wherein the information associated with the content comprises:
information for indicating a related application executed in the second electronic device, the related application being associated with the content, and
information for indicating the activity executed in the second electronic device, the activity being associated with the content,
wherein the content is provided by the related application with the activity on the second electronic device while the gesture is performed, and
wherein the application executed in the first electronic device corresponds to the related application executed in the second electronic device.

20. The non-transitory computer readable medium of claim 11,
wherein the function associated with the content comprises displaying a software keyboard to respond to a message on the application,
wherein the application is a message application,
wherein the activity is an input for responding to the message, and
wherein the content is a notification of an arrival of the message.

* * * * *